(12) United States Patent
Kim et al.

(10) Patent No.: US 12,314,369 B2
(45) Date of Patent: May 27, 2025

(54) ELECTRONIC DEVICE, METHOD, AND NON-TRANSITORY COMPUTER-READABLE STORAGE MEDIA FOR EXECUTING SETUP VIA COMMUNICATION WITH ANOTHER DEVICE

(71) Applicant: SAMSUNG ELECTRONICS CO., LTD., Suwon-si (KR)

(72) Inventors: Heangsu Kim, Suwon-si (KR); Yeongseon Kim, Suwon-si (KR); Ilwoo Kim, Suwon-si (KR); Sungmin Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/083,881

(22) Filed: Dec. 19, 2022

(65) Prior Publication Data

US 2023/0267190 A1 Aug. 24, 2023

Related U.S. Application Data

(63) Continuation of application No. PCT/KR2022/019000, filed on Nov. 28, 2022.

(30) Foreign Application Priority Data

Feb. 22, 2022 (KR) .................. 10-2022-0023273

(51) Int. Cl.
*G06F 21/34* (2013.01)
*G06F 21/60* (2013.01)

(52) U.S. Cl.
CPC ............ *G06F 21/34* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 9,892,249 B2 | 2/2018 | Ding et al. | |
| 2006/0088166 A1* | 4/2006 | Karusawa | H04L 9/3273 |
| | | | 380/277 |
| 2007/0139683 A1 | 6/2007 | Wegeng et al. | |
| 2015/0280933 A1* | 10/2015 | Choi | G06F 9/547 |
| | | | 709/217 |
| 2018/0370486 A1 | 12/2018 | Chin et al. | |
| 2021/0403239 A1* | 12/2021 | Patel | B65G 1/1371 |

FOREIGN PATENT DOCUMENTS

| | | |
|---|---|---|
| JP | 2006-121497 A | 5/2006 |
| KR | 10-2017-0079389 A | 7/2017 |
| KR | 10-1766987 B1 | 8/2017 |
| KR | 10-2019-0001217 A | 1/2019 |

OTHER PUBLICATIONS

PCT Written Opinion dated Mar. 2, 2023 for PCT/KR2022/019000.
International Search Report dated Mar. 2, 2023 for PCT/KR2022/019000.

* cited by examiner

*Primary Examiner* — William J. Goodchild
(74) *Attorney, Agent, or Firm* — Nixon & Vanderhye P.C.

(57) ABSTRACT

A method for operating an electronic device including at least one communication circuit and a display include receiving, via a connection from another electronic device, data that is encrypted based on scan of the barcode through a camera of the other electronic device. The method include executing the initial setup based on at least one signal received from the other electronic device after authenticating the other electronic device by using the data.

20 Claims, 14 Drawing Sheets

ELECTRONIC DEVICE, METHOD, AND NON-TRANSITORY COMPUTER-READABLE STORAGE MEDIA FOR EXECUTING SETUP VIA COMMUNICATION WITH ANOTHER DEVICE

CROSS-REFERENCE TO RELATED APPLICATIONS

This application is a continuation of International Application No. PCT/KR2022/019000, filed on Nov. 28, 2022, designating the United States, in the Korean Intellectual Property Receiving Office, and claiming priority to KR 10-2022-0023273 filed on Feb. 22, 2022, the disclosures of which are all hereby incorporated by reference herein in their entireties.

BACKGROUND

Field

Certain example embodiments relate to an electronic device, a method, and/or a non-transitory computer-readable storage media for executing setup via communication with another electronic device.

Description of Related Art

An electronic device shipped from a factory or performed a factory reset may require a setup, an initial setup, or an initial configuration for use. The setup may include a call activation process, a wireless fidelity (Wi-Fi) setting process, a migration process, an account input process, a predetermined service setting process, a screen lock setting process, and/or a digital security setting process.

SUMMARY

According to an embodiment, an electronic device may comprise at least one communication circuit; a display; a memory configured to store instructions; and a processor, operably coupled with the memory, the at least one communication circuit, and the display. Wherein the processor may be, when the instructions are executed, configured to display, before a connection with another electronic device for assisting an initial setup of the electronic device is established, a barcode for authenticating the other electronic device in a user interface for the initial setup. Wherein the processor may be, when the instructions are executed, configured to establish, in response to a request of the connection, the connection, the request transmitted to the electronic device from the other electronic device based on a signal broadcasted from the electronic device. Wherein the processor may be, when the instructions are executed, configured to receive, via the connection from the other electronic device, data that is encrypted based on scan of the barcode through a camera of the other electronic device. Wherein the processor may be, when the instructions are executed, configured to execute the initial setup based on at least one signal received from the other electronic device after authenticating the other electronic device by using the data.

According to an embodiment, a method for operating an electronic device including at least one communication circuit and a display may comprise displaying, before a connection with another electronic device for assisting an initial setup of the electronic device is established, a barcode for authenticating the other electronic device in a user interface for the initial setup. The method may comprise establishing, in response to a request of the connection, the connection, the request transmitted to the electronic device from the other electronic device based on a signal broadcasted from the electronic device. The method may comprise receiving, via the connection from the other electronic device, data that is encrypted based on scan of the barcode through a camera of the other electronic device. The method may comprise executing the initial setup based on at least one signal received from the other electronic device after authenticating the other electronic device by using the data.

According to an embodiment, a non-transitory computer readable storage medium may store one or more programs, the one or more programs comprising instructions which, when executed by a processor of an electronic device including at least one communication circuit and a display, cause the electronic device to display, before a connection with another electronic device for assisting an initial setup of the electronic device is established, a barcode for authenticating the other electronic device in a user interface for the initial setup. The one or more programs may comprise instructions which, when executed by the processor, cause the electronic device to establish, in response to a request of the connection, the connection, the request transmitted to the electronic device from the other electronic device based on a signal broadcasted from the electronic device. The one or more programs may comprise instructions which, when executed by the processor, cause the electronic device to receive, via the connection from the other electronic device, data that is encrypted based on scan of the barcode through a camera of the other electronic device. The one or more programs may comprise instructions which, when executed by the processor, cause the electronic device to execute the initial setup based on at least one signal received from the other electronic device after authenticating the other electronic device by using the data.

According to an embodiment, an electronic device may comprise a camera; at least one communication circuit; a display; a memory configured to store instructions; and a processor operably coupled with the camera, the memory, the at least one communication circuit, and the display. Wherein the processor may be, when the instructions are executed, configured to display a region for displaying a preview image obtained via the camera in a user interface for assisting an initial setup of another electronic device, based at least in part on an advertising signal received from the other electronic device. Wherein the processor may be, when the instructions are executed, configured to request, based on information for a connection with the other electronic device, the connection to the other electronic device, the information included in the advertising signal. Wherein the processor may be, when the instructions are executed, configured to obtain, after the connection with the other electronic device is established, data encrypted based on scanning a barcode displayed in the other electronic device via the region by using the camera. Wherein the processor may be, when the instructions are executed, configured to transmit the data via the connection to the other electronic device to authenticate the electronic device as a device for assisting the initial setup. Wherein the processor may be, when the instructions are executed, configured to transmit at least one signal for assisting the initial setup to the other electronic device, based at least in part on receiving, from the other electronic device via the connection, a signal indicating that the electronic device is authenticated by using the data in the other electronic device.

According to an embodiment, a method for operating an electronic device including a camera, at least one communication circuit, and a display may comprise displaying a region for displaying a preview image obtained via the camera in a user interface for assisting an initial setup of another electronic device, based at least in part on an advertising signal received from the other electronic device. The method may comprise requesting, based on information for a connection with the other electronic device, the connection to the other electronic device, the information included in the advertising signal. The method may comprise obtaining, after the connection with the other electronic device is established, data encrypted based on scanning a barcode displayed in the other electronic device via the region by using the camera. The method may comprise transmitting the data via the connection to the other electronic device to authenticate the electronic device as a device for assisting the initial setup. The method may comprise transmitting at least one signal for assisting the initial setup to the other electronic device, based at least in part on receiving, from the other electronic device via the connection, a signal indicating that the electronic device is authenticated by using the data in the other electronic device.

According to an embodiment, a non-transitory computer readable storage medium may store one or more programs, the one or more programs comprising instructions which, when executed by a processor of an electronic device including a camera, at least one communication circuit and a display, cause the electronic device to display a region for displaying a preview image obtained via the camera in a user interface for assisting an initial setup of another electronic device, based at least in part on an advertising signal received from the other electronic device. The one or more programs may comprise instructions which, when executed by the processor, cause the electronic device to request, based on information for a connection with the other electronic device, the connection to the other electronic device, the information included in the advertising signal. The one or more programs may comprise instructions which, when executed by the processor, cause the electronic device to obtain, after the connection with the other electronic device is established, data encrypted based on scanning a barcode displayed in the other electronic device via the region by using the camera. The one or more programs may comprise instructions which, when executed by the processor, cause the electronic device to transmit the data via the connection to the other electronic device to authenticate the electronic device as a device for assisting the initial setup. The one or more programs may comprise instructions which, when executed by the processor, cause the electronic device to transmit at least one signal for assisting the initial setup to the other electronic device, based at least in part on receiving, from the other electronic device via the connection, a signal indicating that the electronic device is authenticated by using the data in the other electronic device.

According to an embodiment, an electronic device may comprise a speaker; communication circuits including a first communication circuit for a first communication scheme and a second communication circuit for a second communication scheme; a display; a memory configured to store instructions; and a processor operably coupled with the memory, the communication circuits, and the display. Wherein the processor may be, when the instructions are executed, configured to display, before a connection with another electronic device for assisting an initial setup of the electronic device is established according to the first communication scheme, information guiding that the other electronic device is adjacent to the electronic device in a user interface for the initial setup. Wherein the processor may be, when the instructions are executed, configured to authenticate, after the connection is established, the other electronic device, based at least in part on signals outputted via the speaker while the information is displayed. Wherein the processor may be, when the instructions are executed, configured to display, after the other electronic device is authenticated and another connection with the other electronic device is established according the second communication scheme, at least one visual object guiding authentication of a user for releasing a lock state of the other electronic device in the user interface. Wherein the processor may be, when the instructions are executed, configured to receive at least one user input via the at least one visual object. Wherein the processor may be, when the instructions are executed, configured to execute the initial setup based on account information received from the other electronic device on a condition that the user is authenticated in the other electronic device by using information on the least one user input.

According to an embodiment, a method for operating an electronic device including a speaker, communication circuits including a first communication circuit for a first communication scheme and a second communication circuit for a second communication scheme, and a display may comprise displaying, before a connection with another electronic device for assisting an initial setup of the electronic device is established according to the first communication scheme, information guiding that the other electronic device is adjacent to the electronic device in a user interface for the initial setup. The method may comprise authenticating, after the connection is established, the other electronic device, based at least in part on signals outputted via the speaker while the information is displayed. The method may comprise displaying, after the other electronic device is authenticated and another connection with the other electronic device is established according the second communication scheme, at least one visual object guiding authentication of a user for releasing a lock state of the other electronic device in the user interface. The method may comprise receiving at least one user input via the at least one visual object. The method may comprise executing the initial setup based on account information received from the other electronic device on a condition that the user is authenticated in the other electronic device by using information on the least one user input.

According to an embodiment, a non-transitory computer readable storage medium may store one or more programs, the one or more programs comprising instructions which, when executed by a processor of an electronic device including a speaker, communication circuits including a first communication circuit for a first communication scheme and a second communication circuit for a second communication scheme, and a display, cause the electronic device to display, before a connection with another electronic device for assisting an initial setup of the electronic device is established according to the first communication scheme, information guiding that the other electronic device is adjacent to the electronic device in a user interface for the initial setup. The one or more programs may comprise instructions which, when executed by the processor, cause the electronic device to authenticate, after the connection is established, the other electronic device, based at least in part on signals outputted via the speaker while the information is displayed. The one or more programs may comprise instructions which, when executed by the processor, cause the electronic device to display, after the other electronic device is authenticated and another connection with the other electronic device is established according the second communication scheme, at least one visual object guiding authentication of a user for releasing a lock state of the other electronic device in the user interface. The one or more programs may comprise instructions which, when executed by the processor, cause the electronic device to receive at least one user input via the at least one visual object. The one or more programs may comprise instructions which, when executed by the processor, cause the electronic device to execute the initial setup based on account information received from the other electronic device on a condition that the user is authenticated in the other electronic device by using information on the least one user input.

BRIEF DESCRIPTION OF THE DRAWINGS

The above and other aspects, features, and advantages of certain example embodiments will be more apparent from the following detailed description, taken in conjunction with the accompanying drawings, in which.

DETAILED DESCRIPTION

Figure 1:
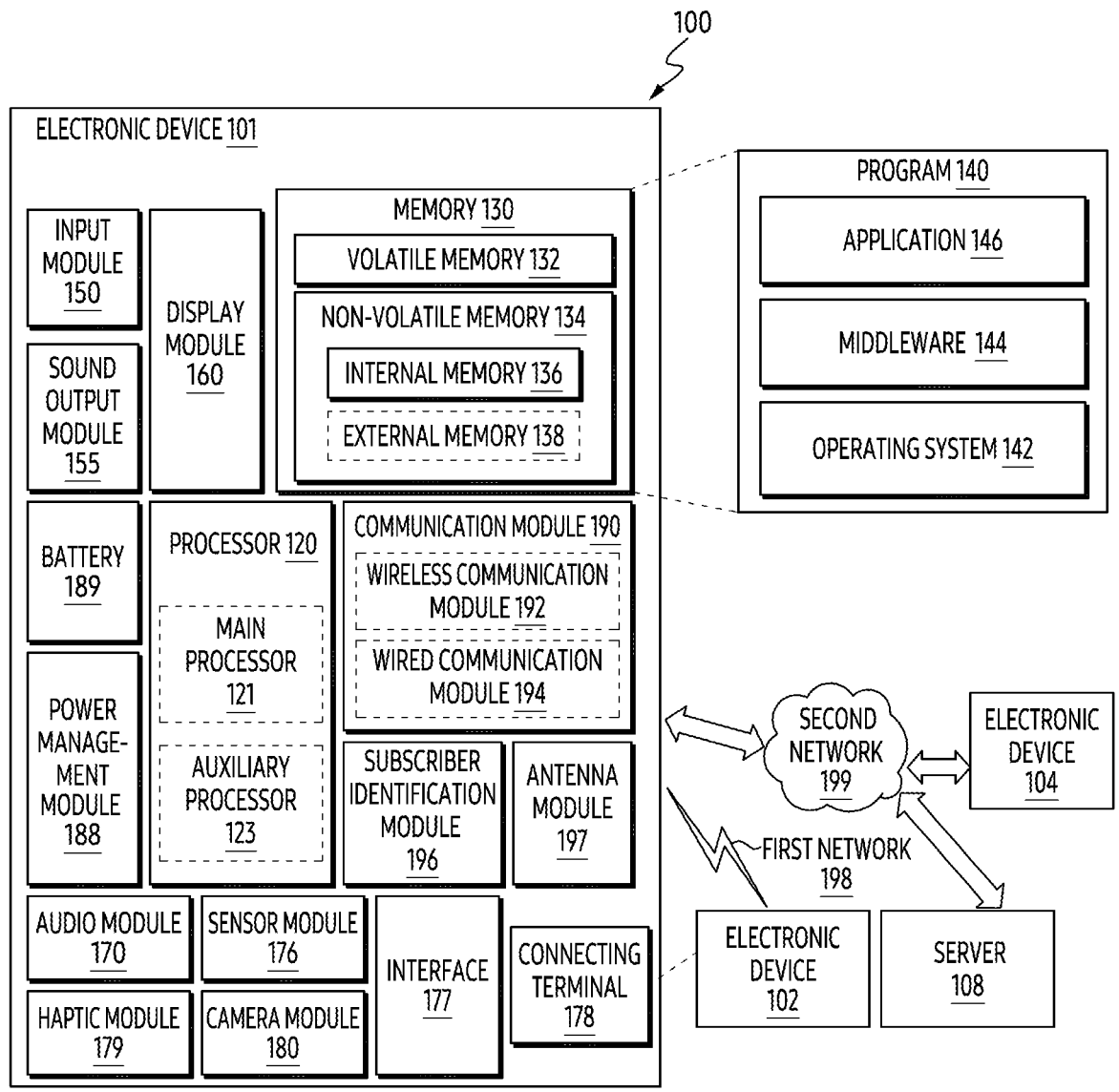
FIG. 1 is a block diagram of an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Setup of the electronic device may include a plurality of processes including the call activation process, the wireless fidelity (Wi-Fi) setting process, the migration process, the account input process, the predetermined service setting process, the screen lock setting process, and/or the digital security setting process. While the plurality of processes are in progress, the electronic device may request a plurality of user inputs. For example, while the setup is in progress, the plurality of user inputs may be requested, including a user input for inputting account information, a user input for inputting the Wi-Fi (wireless fidelity) setting, a user input for migrating a user environment in another electronic device to the electronic device, and a user input for setting a screen lock. Since the user may feel uncomfortable due to the plurality of user inputs, a method for providing a simplified user input while the setup is in progress may be required.

Setup of the electronic device may include a plurality of processes including the call activation process, the wireless fidelity (Wi-Fi) setting process, the migration process, the account input process, the predetermined service setting process, the screen lock setting process, and/or the digital security setting process. While the plurality of processes are in progress, the electronic device may request a plurality of user inputs. For example, while the setup is in progress, the plurality of user inputs may be requested, including a user input for inputting account information, a user input for inputting the Wi-Fi (wireless fidelity) setting, a user input for migrating a user environment in another electronic device to the electronic device, and a user input for setting a screen lock. Since the user may feel uncomfortable due to the plurality of user inputs, a method for providing a simplified user input while the setup is in progress may be required.

Figure 2:
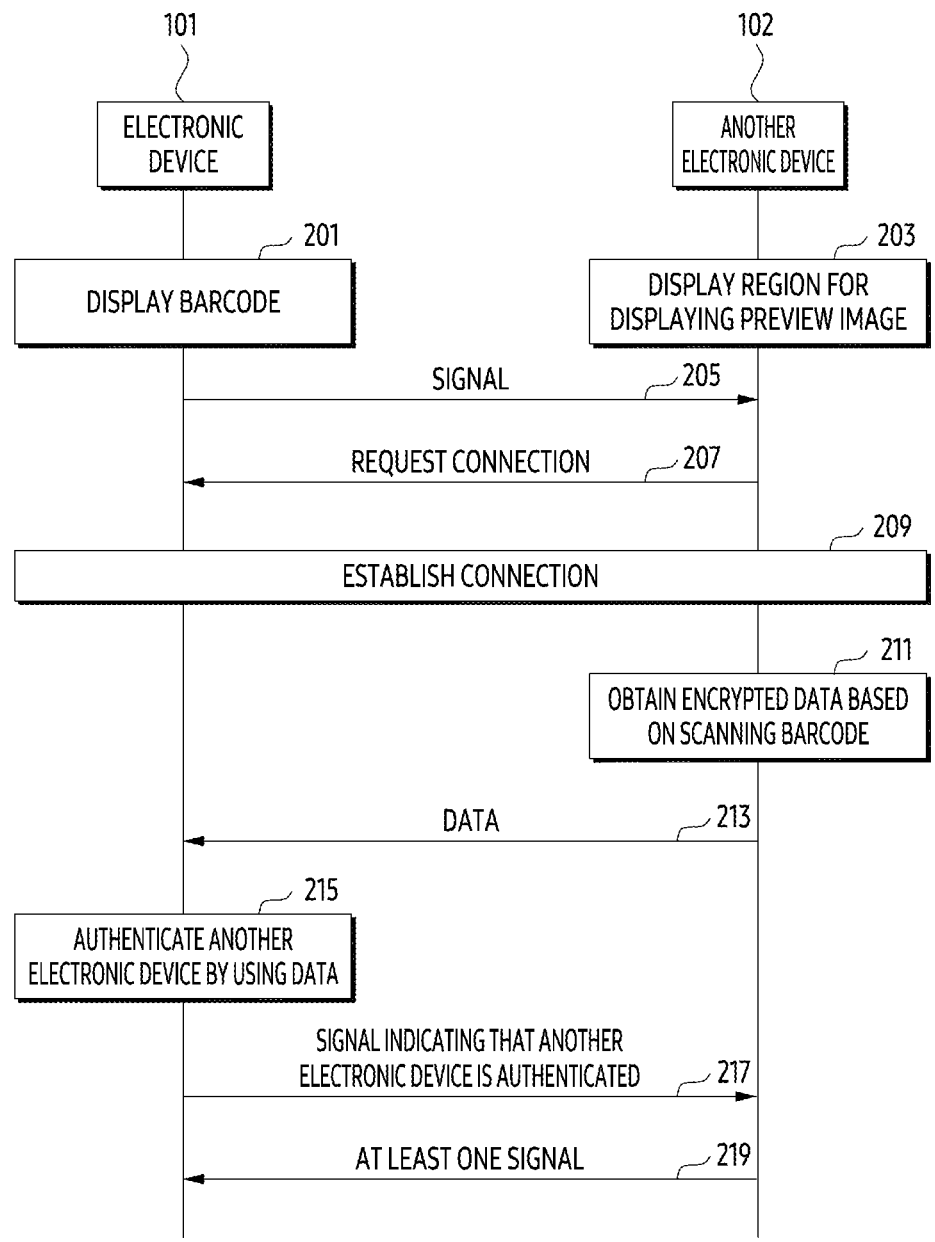
FIG. 2 illustrates an example of signaling between an electronic device and another electronic device for executing an initial setup of the electronic device through assistance of the other electronic device, according to an example embodiment.

FIG. 2 illustrates an example of signaling between an electronic device and another electronic device for executing an initial setup of the electronic device through assistance of the other/another electronic device, according to an embodiment. These signaling may occur between the electronic device 101 and the electronic device 102 (hereinafter, referred to as another/other electronic device 102) illustrated in FIG. 1. For example, when instructions stored in the memory 130 of the electronic device 101 are executed, the at least one processor 120 of the electronic device 101 may be configured to execute one or more of operations 201, 205, 209, 213, 215, 217, and 219 of FIG. 2. For example, when instructions stored in the memory of the other electronic device 102 are executed, the at least one processor (e.g., 120) of the other electronic device 102 may be configured to execute one or more of operation 203, operation 205, operation 207, operation 209, operation 211, operation 213, operation 217, and operation 219 of FIG. 2.

Figure 3:
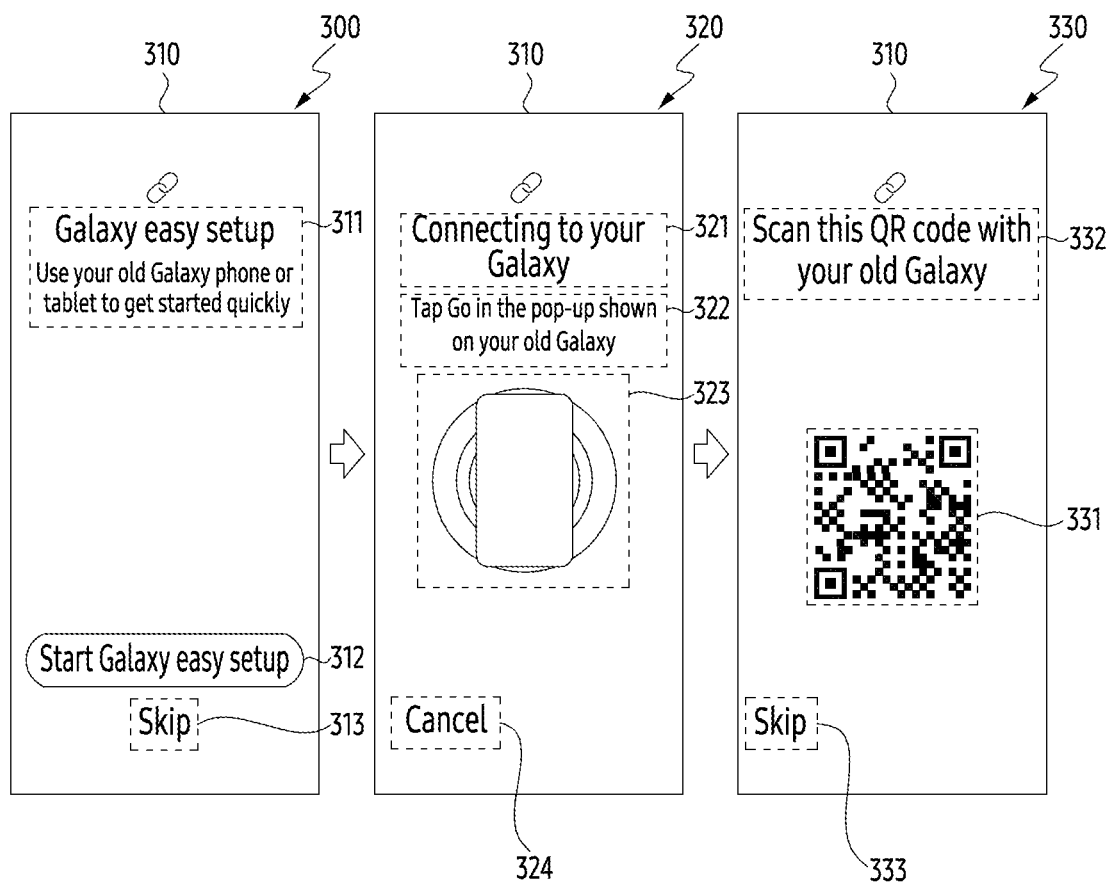
FIG. 3 illustrates an exemplary user interface displayed through a display of an electronic device according to an example embodiment.

FIG. 3 illustrates an exemplary user interface displayed through a display of an electronic device according to an embodiment.

Figure 4:
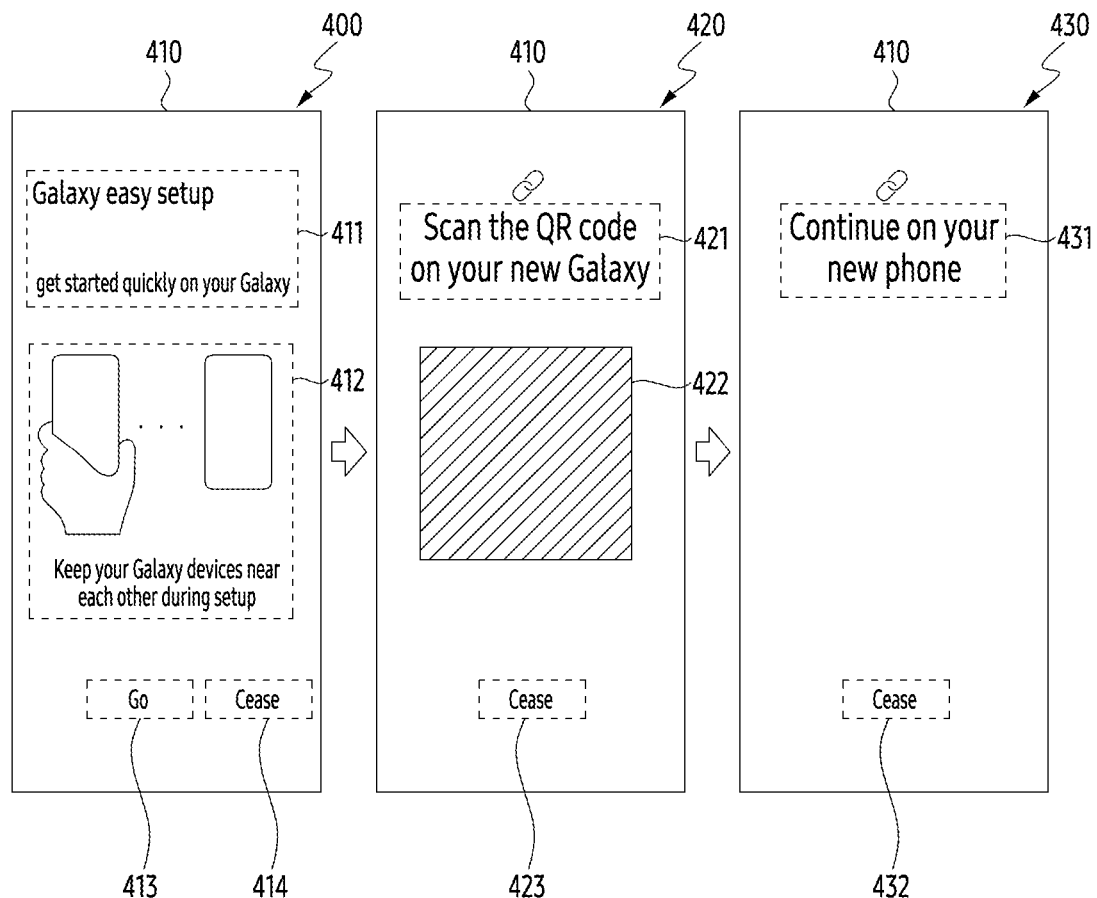
FIG. 4 illustrates an exemplary user interface displayed through a display of another electronic device according to an example embodiment.

FIG. 4 illustrates an exemplary user interface displayed through a display of another electronic device according to an embodiment.

Referring to FIG. 2, the electronic device 101 may be an electronic device shipped from a factory. The electronic device 101 may be an electronic device in which a factory reset has been performed. The electronic device 101 may be an electronic device that requires an initial setup of the electronic device 101 or an initial configuration of the electronic device 101 for use.

The other electronic device 102 may be an electronic device used by a user of the electronic device 101 after performing the initial setup or the initial configuration. The other electronic device 102 may be an electronic device in which a user environment is configured while the other electronic device 102 is used by the user. The other electronic device 102 may be an electronic device for assisting the initial setup of the electronic device 101.

In operation 201, the electronic device 101 may display a barcode for authenticating the other electronic device 102 within the user interface for the initial setup before a connection with the other electronic device 102 for assisting the initial setup of the electronic device 101 is established. For example, referring to FIG. 3, the electronic device 101 may provide a first display state 300 through a display (e.g., a display module 160, comprising a display) of the electronic device 101. For example, in the first display state 300, the electronic device 101 may display information 311 that guides the initial setup of the electronic device 101 through assistance of the other electronic device 102 in the user interface 310 for the initial setup. For example, in the first display state 300, the electronic device 101 may display an executable object 312 to execute the initial setup of the electronic device 101 through the assistance of the other electronic device 102 and an executable object 313 to skip the initial setup of the electronic device 101 through the assistance of the other electronic device 102. For example, the electronic device 101 may execute the initial setup without the assistance of the other electronic device 102 in response to a user input for the executable object 313. For another example, the electronic device 101 may change the first display state 300 to the second display state 320 in response to a user input for the executable object 312.

For example, in the second display state 320, the electronic device 101 may display information 321 for notifying that communication with the other electronic device 102 is performed in the user interface 310. The information 321 includes a text indicating a connection to the other electronic device 102, but in an embodiment, the electronic device 101 may not establish a connection with the other electronic device 102 in the second display state 320. For example, the text in the information 321 may be intended to guide that a signal is broadcasted from the electronic device 101 or that a signal is broadcasted from the other electronic device 102 before the connection is established. However, it is not limited thereto. For example, in the second display state 320, the electronic device 101 may display information 322 guiding to cause a user input for a pop-up screen (e.g., a user interface) displayed through the display of the other electronic device 102 in the user interface 310. For example, in the second display state 320, the electronic device 101 may display a visual object 323 for notifying that a signal is being broadcasted from the electronic device 101 within the user interface 310. For example, in the second display state 320, the electronic device 101 may display an executable object 324 for stopping or skipping the initial setup of the electronic device 101 through the assistance of the other electronic device 102 within the user interface 310. For example, in response to user input to executable object 324, the electronic device 101 may stop or skip the initial setup of the electronic device 101 through the assistance of the other electronic device 102. For example, the electronic device 101 may change the second display state 320 to the third display state 330 based on a signal broadcast from the other electronic device 102. The signal broadcast from the other electronic device 102 will be described in detail with reference to FIG. 10.

For example, in the third display state 330, the electronic device 101 may display a barcode 331 which is the barcode defined through the description of FIG. 2, within the user interface 310. For example, the barcode 331 may be configured as a quick response (QR) code. For example, the barcode 331 may be configured to be readable by a computing device. For example, the barcode 331 may be configured in a one-dimensional matrix form (e.g., a linear form) or may be configured in a two-dimensional matrix form. For example, information included in the barcode 331 will be described later through the descriptions of operations 211 and 213. For example, in the third display state 330, the electronic device 101 may display information 332 that guides scanning the barcode 331 by using the other electronic device 102 within the user interface 310. For example, in the third display state 330, the electronic device 101 may display an executable object 333 for skipping the initial setup of the electronic device 101 through the assistance of the other electronic device 102 within the user interface 310. For example, in response to user input to the executable object 333, the electronic device 101 may skip the initial setup of the electronic device 101 through the assistance of the other electronic device 102 and execute the initial setup of the electronic device 101 without the assistance of the other electronic device 102.

Referring back to FIG. 2, in operation 203, the other electronic device 102 may display a region for displaying a preview image obtained through a camera of the other electronic device 102 within a user interface for assisting the initial setup of the electronic device 101, based at least in part on an advertising signal received from the electronic device 101. For example, referring to FIG. 4, the other electronic device 102 may provide a first display state 400 through a display of the other electronic device 102. For example, the other electronic device 102 may provide the first display state 400 in response to receiving the advertising signal from the electronic device 101. For example, the advertising signal may be a signal broadcast from the electronic device 101 providing the second display state 320 (e.g., see FIG. 3). For example, the advertising signal may be a signal broadcast from the electronic device 101 to indicate that the initial setup of the electronic device 101 through the other electronic device 102 is applied within the electronic device 101. For example, the advertising signal may be a signal broadcast from the electronic device 101 in response to a user input to the executable object 312 within the first display state 300 (e.g., see FIG. 3). However, it is not limited thereto. In an embodiment, the advertising signal may be broadcast from the electronic device 101 with a transmission power lower than a reference transmission power. For example, since the device for assisting the initial setup of the electronic device 101 may be a device managed by a user of the electronic device 101, the advertising signal may be broadcast from the electronic device 101 with the transmission power lower than the reference transmission power. However, it is not limited thereto.

For example, in the first display state 400, the other electronic device 102 may display information 411 that guides the initial setup of the electronic device 101 through the assistance of the other electronic device 102 in a user interface 410. For example, in the first display state 400, the other electronic device 102 may display information 412 that guides the other electronic device 102 to be adjacent to the electronic device 101. For example, in the first display state 400, the other electronic device 102 may display an executable object 413 for executing operations for the initial setup of the electronic device 101 through the assistance of the other electronic device 102 within the other electronic device 102, and an executable object 414 for skipping or stopping executing of the operations for the initial setup of the electronic device 101 through the assistance of the other electronic device 102 within the other electronic device 102. For example, in response to user input to the executable object 414, the other electronic device 102 may execute an operation for stopping the other electronic device 102 from assisting the initial setup of the electronic device 101. For example, in response to a user input to the executable object 413, the other electronic device 102 may change the first display state 400 to the second display state 420.

For example, in the second display state 420, the other electronic device 102 may display information 421 that guides scanning the barcode (e.g., barcode 331) displayed through the display of the electronic device 101 through a camera of the other electronic device 102 within the user interface 410. For example, in the second display state 420, the other electronic device 102 may display a region 422 for displaying a preview image obtained through the camera for the scan within the user interface 410. For example, in response to the user input to the executable object 413 in the first display state 400, the other electronic device 102 may activate the camera and provide the second display state 420 for displaying the user interface 410 including the region 422, on a condition that the camera is deactivated. For example, in the second display state 420, the other electronic device 102 may display, within the user interface 410, an executable object 423 for skipping or stopping executing operations for the initial setup of the electronic device 101 through the assistance of the other electronic device 102 in the other electronic device 102. For example, in response to a user input to the executable object 423, the other electronic device 102 may execute an operation for stopping the other electronic device 102 from assisting the initial setup of the electronic device 101. For example, the other electronic device 102 may change the second display state 420 to the third display state 430 based on receiving a signal, from the electronic device 101, indicating that the other electronic device 102 is authenticated in the electronic device 101. The signal will be described later through the description of operation 217.

For example, in the third display state 430, the other electronic device 102 may display, within the user interface 410, information 431 guiding that the initial setup of the electronic device 101 through the assistance of the other electronic device 102 will proceed in the electronic device 101. For example, in the third display state 430, the other electronic device 102 may display, within the user interface 410, an executable object 432 for skipping or stopping executing operations for the initial setup of the electronic device 101 through the assistance of the other electronic device 102 in the other electronic device 102. For example, in response to user input to executable object 432, the other electronic device 102 may execute an operation for stopping the other electronic device 102 from assisting the initial setup of electronic device 101.

Referring back to FIG. 2, in operation 205, the electronic device 101 may broadcast a signal in response to displaying the barcode within the user interface 310. For example, the signal may be broadcasted from the electronic device 101 to indicate that the user interface 310 including the barcode is displayed through the display of the electronic device 101. For example, the signal may be broadcast through a communication circuit of the electronic device 101 for a first communication scheme. For example, the first communication scheme may be a communication scheme for providing a direct connection between the electronic device 101 and an external electronic device (e.g., another electronic device 102). For example, the first communication scheme may be a communication scheme for supporting short range communication. For example, the first communication scheme may be Bluetooth low energy (BLE). For example, the signal broadcast according to the first communication scheme may be an advertising signal. However, it is not limited thereto.

In an embodiment, the signal may include information for connection with the electronic device 101. For example, the signal may include information of the electronic device 101. For example, the information may include identification information of the electronic device 101. However, it is not limited thereto. In an embodiment, the signal may include a unique identifier. For example, the unique identifier may be obtained based on a hash function. For example, the unique identifier may be used for the connection. For example, the unique identifier may be used to indicate that the user interface (e.g., user interface 310) including the barcode is displayed through the display of the electronic device 101. However, it is not limited thereto.

In an embodiment, the signal may be broadcasted with a transmission power lower than the reference transmission power. For example, since the other electronic device 102 may be adjacent to the electronic device 101 for the scan of the barcode, the signal may be broadcasted with the transmission power lower than the reference transmission power. However, it is not limited thereto.

Meanwhile, the other electronic device 102 may receive the broadcast signal from the electronic device 101. For example, the other electronic device 102 may receive the signal while the second display state 420 is provided. However, it is not limited thereto.

In operation 207, the other electronic device 102 may request a connection between the electronic device 101 and the other electronic device 102 to the electronic device 101 based on the signal. For example, the connection may be a direct connection that directly exchanges signals between the electronic device 101 and the other electronic device 102 without an intermediate node (or relay node) such as a base station and an access point (AP). For example, the connection may be configured through the first communication scheme. For example, the connection may be a connection for short-range communication. However, it is not limited thereto.

In an embodiment, the other electronic device 102 may request the connection to the electronic device 101 based on the information for the connection with the electronic device 101 included in the signal.

Meanwhile, the electronic device 101 may receive the request of the connection from the other electronic device 102.

In operation 209, the electronic device 101 may establish the connection with the other electronic device 102 in response to the request. In an embodiment, the request may include 'CONNECT_IND'. For example, 'CONNECT_IND' may include 'transmitWindowOffset' and 'transmitWindowSize' to indicate a time resource in which the other electronic devices 102 transmit information, signal, data, or packet. For example, the electronic device 101 may establish the connection by receiving information, signal, data, or packet from other electronic devices 102 within the time resource. However, it is not limited thereto.

In operation 211, the other electronic device 102 may obtain encrypted data based on scanning the barcode (e.g., barcode 331) by using the camera after the connection with the electronic device 101 is established.

In an embodiment, the scan may be executed before the connection is established. For example, the other electronic device 102 may execute the scan of the barcode by obtaining an image including the barcode (e.g., barcode 331) displayed in operation 201 by using the camera through the region 422 within the user interface 410 in the second display state 420, before the connection is established in operation 209. However, it is not limited thereto.

In an embodiment, the scan may be executed after the connection is established. For example, the other electronic device 102 may execute the scan of the barcode by obtaining the image including the barcode (e.g., barcode 331) displayed in operation 201 by using the camera through the region 422 within the user interface 410 in the second display state 420, after the connection is established in operation 209. However, it is not limited thereto.

The other electronic device 102 may obtain information on the barcode based on the scan and obtain the encrypted data by using the obtained information. The encryption will be described in detail with reference to FIG. 13.

In operation 213, the other electronic device 102 may transmit the data to the electronic device 101. For example, since the data is data encrypted based on the scan, the data may be transmitted from the other electronic device 102 to the electronic device 101 in order to authenticate the other electronic device 102 in the electronic device 101. For example, the data may be transmitted from the other electronic device 102 to the electronic device 101 to identify that the other electronic device 102 is a device for assisting the initial setup of the electronic device 101 in the electronic device 101.

For example, the data may be transmitted to the electronic device 101 through the connection. For example, the data may be unicast, unlike the signal in operation 205. However, it is not limited thereto.

Meanwhile, the electronic device 101 may receive the data from the other electronic device 102 through the connection.

In operation 215, the electronic device 101 may authenticate the other electronic device 102 by using the data. For example, the electronic device 101 may authenticate that the other electronic device 102 is a device that scans the barcode by using the data. For example, the electronic device 101 may authenticate the other electronic device 102 as a device assisting the initial setup of the electronic device 101 by using the data. The authentication will be described in detail with reference to FIG. 13.

In operation 217, in response to the authentication, the electronic device 101 may transmit a signal indicating that the other electronic device 102 is authenticated to the other electronic device 102. For example, the signal may be transmitted to the other electronic device 102 through the connection. For example, the signal may be unicast, unlike the signal in operation 205. However, it is not limited thereto.

Meanwhile, the other electronic device 102 may receive the signal from the electronic device 101. For example, the other electronic device 102 may change the display state in response to the reception of the signal. For example, referring to FIG. 4, the other electronic device 102 may change the second display state 420 to the third display state 430 in response to the reception of the signal. However, it is not limited thereto.

In operation 219, the other electronic device 102 may transmit at least one signal for assisting the initial setup of the electronic device 101 based at least in part on receiving the signal.

For example, the at least one signal may include information used during the initial setup of the electronic device 101.

In an embodiment, the at least one signal may include a first signal including information indicating whether a scheme for authentication of a user for releasing a lock state of the other electronic device 102 is enabled in the other electronic device 102. For example, the lock state may indicate a state in which the use of the remaining functions is restricted except for at least one predetermined function among the functions available in the other electronic device 102. For example, the lock state may indicate a state in which only the change from the lock screen displayed through the display of the other electronic device 102 to at least one predetermined screen is applied within the other electronic device 102, on a condition that the authentication of the user is not executed. However, it is not limited thereto. For example, the scheme may include a scheme for authenticating the user through a passcode registered in the other electronic device 102, a scheme for authenticating the user through a password registered in the other electronic device 102, a scheme for authenticating the user through a pattern registered in the other electronic device 102, and/or a scheme for authenticating the user through biometric information (e.g., fingerprint information, iris information, vein information, arterial information, and/or face information) registered in the other electronic device 102. However, it is not limited thereto.

In an embodiment, the at least one signal may include a second signal that includes reference data for authenticating the user registered in the other electronic device 102. For example, the reference data may be data registered by the user for comparison with a user input (e.g., user input for entering a passcode, user input for entering a password, user input for entering a pattern, and/or user input for entering biometric information) for authenticating the user, which is received by the other electronic device 102. However, it is not limited thereto.

In an embodiment, the at least one signal may include a third signal including configuration information, stored in the other electronic device 102, for communication through a second communication scheme distinct from the first communication scheme. For example, the second communication scheme may be a communication scheme that provides coverage wider than the coverage of communication according to the first communication scheme. For example, the second communication scheme may be a communication scheme for supporting short-range communication distinct from the first communication scheme. For example, unlike the first communication scheme, the second communication scheme may be a communication scheme that supports connection to an external electronic device (e.g., electronic device 101) through an intermediate node. For example, like the first communication scheme, the second communication scheme may be a communication scheme that supports direct connection to an external electronic device (e.g., electronic device 101) without the use of the intermediate node. For example, the second communication scheme may support Wireless Fidelity (Wi-Fi) communication. For example, the second communication scheme may support Wi-Fi direct communication. However, it is not limited thereto. In an embodiment, the configuration information may include data for connecting or accessing to an external electronic device in which the other electronic device 102 was connected, directly or indirectly, according to the second communication scheme. For example, the configuration information may include address data (or identification data) of the external electronic device and/or authentication data, such as a password, required for connection or access to the external electronic device. For example, the configuration information may include data for connecting or accessing the other electronic devices 102 according to the second communication scheme. However, it is not limited thereto.

In an embodiment, the at least one signal may include a fourth signal, used in the other electronic device 102, including the user's account information. For example, the account information may include data on the user's identifier and/or data on a password related to the identifier. For example, the account information may include account data related to a manufacturer of the other electronic device 102. For example, the account information may include account data related to an operating system of the other electronic device 102. For example, the account information may include account data for accessing a cloud service used in the other electronic device 102. For example, the account information may include account data for connecting or accessing a device related to a service provider provided through the other electronic device 102. However, it is not limited thereto.

In an embodiment, the at least one signal may include a fifth signal including information for transferring a user environment configured in the other electronic device 102 to the electronic device 101. For example, the information may include data for transmitting at least one software application stored in the other electronic device 102 to be available in the electronic device 101 and restoring a user setting of the at least one software application in the electronic device 101. However, it is not limited thereto.

Meanwhile, the electronic device 101 may receive the at least one signal from the other electronic device 102. The electronic device 101 may complete the initial setup through a simplified user input based on the at least one signal.

As described above, the electronic device 101 may provide the simplified initial setup based on the assistance of the other electronic devices 102 authenticated through communication linked to the use of visual information such as a barcode. The electronic device 101 may provide an enhanced user experience through the initial setup. Since receiving encrypted data from the other electronic device 102 by using the visual information, and authenticating the other electronic device 102 as the device for the initial setup based on the encrypted data, the electronic device 101 may execute the initial setup within an enhanced security environment.

Figure 5:
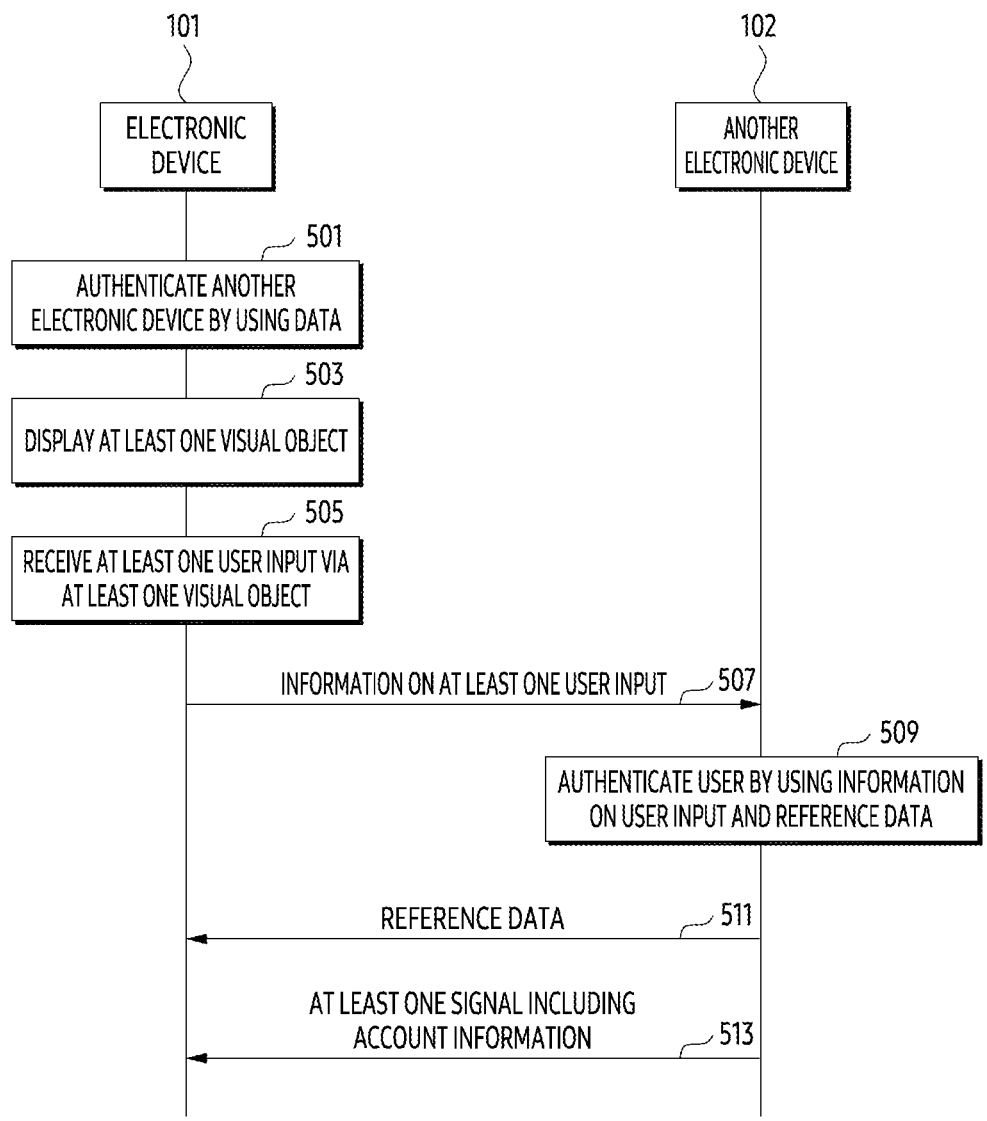
FIG. 5 illustrates another example of signaling for an initial setup of an electronic device through assistance of another electronic device in the electronic device and the other electronic device, according to an example embodiment.

FIG. 5 illustrates another example of signaling for an initial setup of an electronic device through assistance of another electronic device in the electronic device and the other electronic device, according to an embodiment. These signaling may occur between the electronic device 101 and the electronic device 102 (hereinafter, referred to as another electronic device 102) illustrated in FIG. 1. For example, when instructions stored in the memory 130 of the electronic device 101 are executed, the at least one processor 120 of the electronic device 101 may be configured to execute one or more of operation 501, operation 503, operation 505, operation 507, operation 511, and operation 513 of FIG. 5. For example, when instructions stored in the memory of the other electronic device 102 are executed, the at least one processor of the other electronic device 102 may be configured to execute one or more of operation 507, operation 509, operation 511 and operation 513 of FIG. 5. Each "processor" herein comprises processing circuitry.

Figure 6:
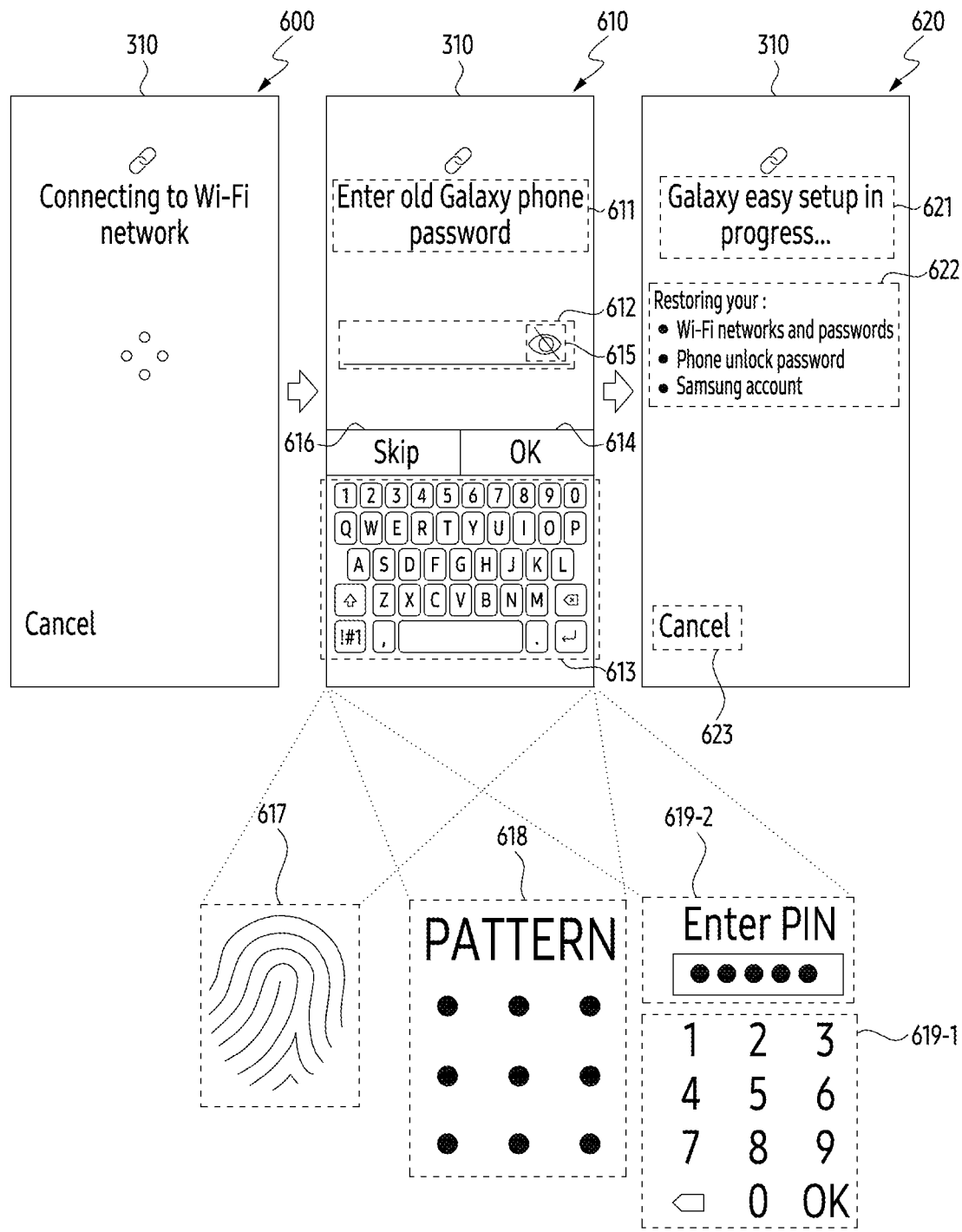
FIG. 6 illustrates an exemplary user interface including at least one visual object displayed through a display of an electronic device, according to an example embodiment.

FIG. 6 illustrates an exemplary user interface including at least one visual object displayed through a display of an electronic device, according to an embodiment.

Referring to FIG. 5, in operation 501, the electronic device 101 may authenticate the another/other electronic device 102 by using the data received from the other electronic device 102 through operation 213 of FIG. 2. For example, operation 501 may correspond to operation 215 of FIG. 2.

In operation 503, the electronic device 101 may display at least one visual object that guides the user's authentication for releasing a lock state of the other electronic device 102 within the user interface for the initial setup, after the other electronic device 102 is authenticated. For example, referring to FIG. 6, the electronic device 101 may provide a fifth display state 610 after the other electronic device 102 is authenticated by using the data. For example, in the fifth display state 610, The electronic device 101 may display the at least one visual object including information 611 including text that guides to cause at least one user input for inputting information for the authentication of the user for releasing the lock state of the other electronic device 102, an input portion 612 (e.g., text input portion) indicating a state in which at least one user input is received, an input means 613 capable of receiving the at least one user input (e.g., virtual keyboard), and an executable object 614 for providing an input indicating that the at least one user input is completed to the electronic device 101, within the user interface 310. For example, the at least one visual object in the fifth display state 610 may correspond to at least one other visual object, displayed within the lock screen of the other electronic device 102 to release the lock state of the other electronic device 102, for the user's authentication. In an embodiment, the arrangement of the at least one visual object in the fifth display state 610 may correspond to the arrangement of the at least one other visual object so that the user's experience configured in the other electronic device 102 lasts in the electronic device 101. However, it is not limited thereto. In an embodiment, when the size of the display region of the electronic device 101 is different from the size of the display region of the other electronic device 102, the arrangement of the at least one visual object in the fifth display state 610 may be different from the arrangement of the at least one other visual object.

In an embodiment, the input part 612 may further include an executable object 615 for releasing displaying the state in which the at least one user input is received as a predetermined character (e.g., ★, ●, or ■). However, it is not limited thereto. In an embodiment, input means 613 (comprising input circuitry) may appear within the user interface 310, in response to a touch input to input portion 612. However, it is not limited thereto.

In an embodiment, in response to a user input to executable object 614, the electronic device 101 may transmit the information on the at least one user input to the other electronic device 102 in operation 507. However, it is not limited thereto.

For example, in the fifth display state 610, the electronic device 101 may further display an executable object 616 for skipping or stopping the initial setup through the assistance of the other electronic device 102 within the user interface 310. For example, in response to user input to executable object 616, the electronic device 101 may skip or stop the initial setup through the assistance of the other electronic device 102.

The at least one visual object in the fifth display state 610 may be displayed differently according to the user's authentication scheme provided in the other electronic device 102. For example, on a condition that the authentication of the user through biometric information recognition (e.g., fingerprint recognition) is provided in the other electronic device 102, the at least one visual object may include a visual object 617 for guiding a region or a location capable of receiving the biometric information. For another example, on a condition that the authentication of the user through drawing of a pattern is provided in the other electronic device 102, the at least one visual object may include a plurality of guidance objects 618 for drawing the pattern. For still another example, on the condition that the authentication of the user through input of a passcode is provided in the other electronic device 102, the at least one visual object may include an input means 619-1 for inputting the passcode and a visual object 619-2 for displaying an input state through the input means 619-1 which may comprise input circuitry. However, it is not limited thereto.

In an embodiment, the fifth display state 610 may be changed or switched from the fourth display state 600. For example, the fourth display state 600 may be provided in the electronic device 101 after the other electronic device is authenticated in operation 501. For example, the fourth display state 600 may be provided in the electronic device 101 before operation 503 is executed. For example, operations of the electronic device 101 and operations of the other electronic device 102 related to the fourth display state 600 will be described in detail with reference to FIG. 9. However, it is not limited thereto.

Referring back to FIG. 5, in operation 505, the electronic device 101 may receive the at least one user input through the at least one visual object. For example, the user may cause the at least one user input corresponding to the input cause to release the lock state of the other electronic device 102 for the electronic device 101.

In operation 507, the electronic device 101 may transmit information on the at least one user input to the other electronic device 102 in response to the at least one user input. For example, since the electronic device 101 is in a state in which the reference data to release the lock state of the other electronic device 102 is not registered, the electronic device 101 may transmit the information to the other electronic device 102. For example, since the electronic device 101 in operation 507 is in a state in which only the authentication of the other electronic device 102 is completed among the authentication of the other electronic device 102 and the authentication of the user, the electronic device 101 may transmit the information to the other electronic device 102 for authentication of the user. For example, referring to FIG. 6, the electronic device 101 may transmit the information to the other electronic device 102 in response to a user input to an executable object 614 in the fifth display state 610. However, it is not limited thereto.

Referring back to FIG. 5, in an embodiment, the information may be transmitted to the other electronic device 102 through the connection established in operation 209. In an embodiment, the information may be transmitted through another connection with the other electronic device 102, which is established through operation 911 of FIG. 9.

Meanwhile, the other electronic device 102 may receive the information from the electronic device 101.

In operation 509, the other electronic device 102 may authenticate the user by using the information on the user input and the reference data. For example, the other electronic device 102 may identify whether the information corresponds to the reference data. The other electronic device 102 may authenticate the user on a condition that the information corresponds to the reference data, and may not authenticate the user on a condition that the information is different from the reference data.

In an embodiment, the reference data may be stored in a secure region within a storage region defined in the other electronic device 102. For example, the other electronic device 102 may provide the information to the security region. The information provided to the security region may be compared with the reference data within a security execution region of the electronic device 102 related to the security region. The result of the comparison may be provided as a normal execution region of the electronic device 102. For example, the result of the comparison may indicate that the information corresponds to the reference data or that the information is different from the reference data. However, it is not limited thereto.

In operation 511, the other electronic device 102 may transmit the reference data to the electronic device 101 on a condition that the user is authenticated. For example, the reference data may be transmitted to the electronic device 101 to indicate that the user is authenticated. For example, the reference data may be transmitted to the electronic device 101 to provide a user environment corresponding to a user authentication environment used to release the lock state of the other electronic device 102. For example, the reference data may be transmitted to the electronic device 101 to provide a scheme corresponding to the scheme for authentication of the user used in the other electronic device 102. However, it is not limited thereto.

In an embodiment, the reference data may be transmitted from the other electronic device 102 through a connection established in operation 209. In an embodiment, the reference data may be transmitted through a different connection with the other electronic device 102, established through operation 911 of FIG. 9.

Meanwhile, the electronic device 101 may receive the reference data from the other electronic device 102. In an embodiment, the electronic device 101 may change the display state provided through the display of the electronic device 101 in response to the reception of the reference data. For example, referring to FIG. 6, the electronic device 101 may provide a sixth display state 620 changed from the fifth display state 610 in response to receiving the reference data from the other electronic device 102 in the fifth display state 610. For example, in the sixth display state 620, the electronic device 101 may display the user interface 310 including information 621 guiding that the initial setup through the assistance of the other electronic device 102 is in progress. For example, in the sixth display state 620, the electronic device 101 may display the user interface 310 including information 622 on the user environment of the other electronic device 102 migrated to the electronic device 101 through the execution of the initial setup. For example, in the sixth display state 620, the electronic device 101 may display the user interface 310 including an executable object 623 for skipping, stopping, or canceling the initial setup through the assistance of the other electronic device 102. For example, the electronic device 101 may skip, stop, or cancel the initial setup through the assistance of the other electronic device 102 in response to a user input to the executable object 623. However, it is not limited thereto.

Referring back to FIG. 5, in operation 513, the other electronic device 102 may transmit the at least one signal including the user's account information registered in the other electronic device 102 after the reference data is transmitted to the electronic device 101. For example, the at least one signal may be transmitted to the electronic device 101 to assist the initial setup. For example, the at least one signal may be transmitted to the electronic device 101 in order to reduce the number of times the electronic device 101 requests the user to input information during the initial setup in the electronic device 101. For example, the at least one signal may be the fourth signal.

In an embodiment, the at least one signal may be transmitted from the other electronic device 102 through the connection established in operation 209. In an embodiment, the at least one signal may be transmitted through another connection with the other electronic device 102 established through operation 911 of FIG. 9.

The transmission of the at least one signal including the account information will be described in detail with reference to FIG. 8.

Meanwhile, the electronic device 101 may receive the at least one signal from the other electronic device 102. For example, the electronic device 101 may execute the initial setup of the electronic device 101 based on the at least one signal. For example, the electronic device 101 may bypass receiving the account information through a user input during the initial setup.

As described above, the electronic device 101 may execute the initial setup through the assistance of the other electronic device 102 based on authenticating the user by using the other electronic device 102. For example, since the initial setup is executed through the assistance of the other electronic device 102 after the user is authenticated, the electronic device 101 may provide an enhanced user convenience in relation to the initial setup within an enhanced security environment.

Figure 7:
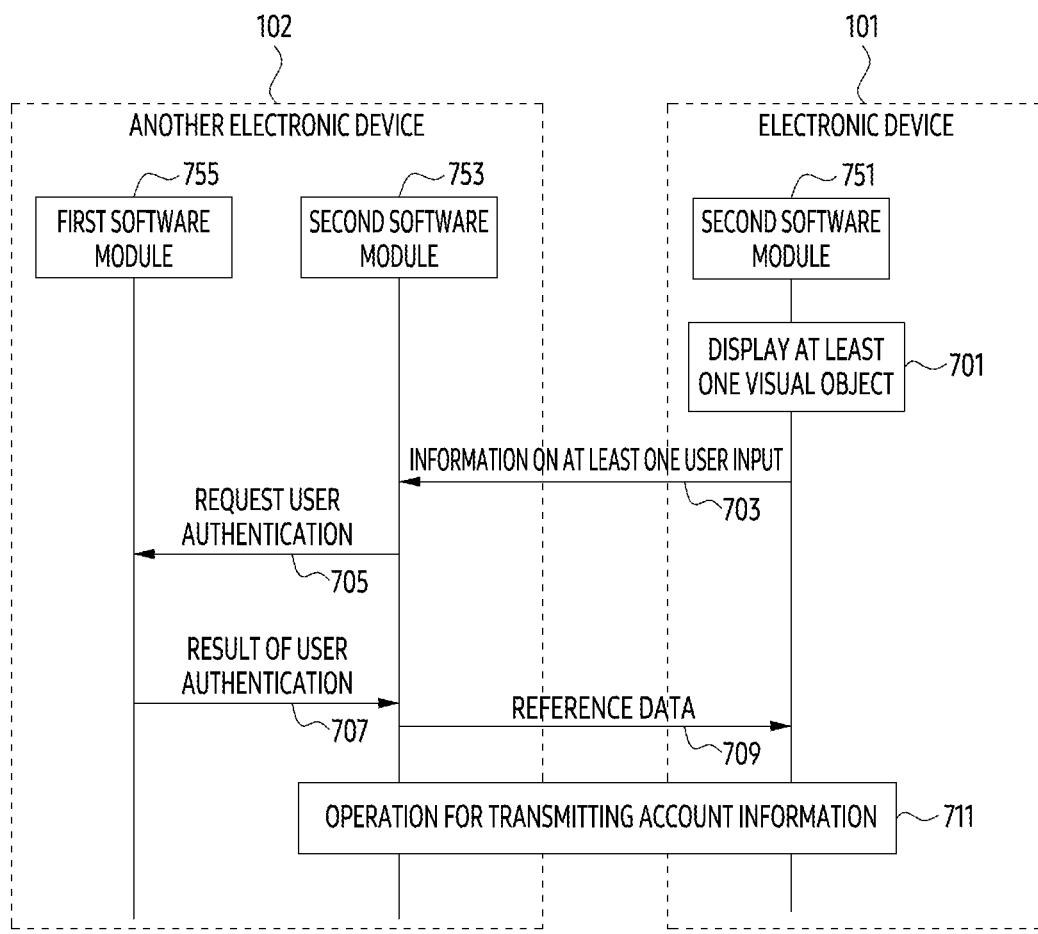
FIG. 7 illustrates an example of signaling between an electronic device and another electronic device for transmitting at least one signal including account information, according to an example embodiment.

FIG. 7 illustrates an example of signaling between an electronic device and another electronic device for transmitting at least one signal including account information, according to an embodiment. These signaling may occur between an electronic device 101 and an electronic device 102 (hereinafter, referred to as another/other electronic device 102) illustrated in FIG. 1. For example, the at least one processor 120 of the electronic device 101 may execute one or more of operation 701, operation 703, operation 709, and operation 711 through the second software module 751. For example, the at least one processor of the other electronic device 102 may execute one or more of operations 703, 705, 707, 709, and 711 through the second software module 753 and the first software module 755. The term "software module" as used herein may include various processing circuitry and/or executable program instructions.

Referring to FIG. 7, the second software module 751 of the electronic device 101 may be stored in the electronic device 101 for the initial setup of the electronic device 101. For example, the second software module 751 may be an application programming interface (API). For example, the second software module 751 may be a software application (e.g., application 146 of FIG. 1). However, it is not limited thereto.

In operation 701, the second software module 751 may display the at least one visual object defined through descriptions of FIGS. 5 and 6 through the display of the electronic device 101. The second software module 751 may obtain information on at least one user input received through the at least one visual object.

In operation 703, the second software module 751 may provide the information on the at least one user input to the other electronic device 102. For example, the other electronic device 102 may obtain the information by using the second software module 753 of the other electronic device 102. For example, the second software module 753 may be stored in the other electronic device 102 for the initial setup. For example, the second software module 753 may be an API. For example, the second software module 753 and/or 751 may be a software application to be executed by at least one processor. However, it is not limited thereto.

In operation 705, the second software module 753 may request the authentication of the user to the first software module 755 of the other electronic device 102 based on the information. For example, the first software module 755 may be a framework. For example, the first software module 755 may be a software application. However, it is not limited thereto. For example, the second software module 753 may request the authentication of the user based on providing the information to the first software module 755.

Meanwhile, the first software module 755 may obtain the request from the second software module 753. In response to the request, the first software module 755 may compare the information with the reference data for the authentication of the user.

In operation 707, the first software module 755 may provide a result of the comparison to the second software module 753 as a result of the authentication of the user. For example, the first software module 755 may provide the reference data to the second software module 753 on a condition that authenticates the user. According to embodiments, the reference data may be encrypted to be decrypted in the electronic device 101. The second software module 753 may obtain the result of the authentication from the first software module 755. For example, the second software module 753 may obtain the reference data from the first software module 755.

In operation 709, the second software module 753 may provide the reference data to the electronic device 101. For example, the reference data may be transmitted to the electronic device 101 to provide a user environment related to the lock state of the other electronic device 102. In an embodiment, the reference data may include data including a result of the authentication of the user. For example, the reference data may include data indicating success or failure of the authentication of the user. In an embodiment, when the data included in the reference data is data indicating the success of the authentication of the user, the second software module 751 may set user input data received through the at least one visual object as data (e.g. pattern information and/or password) for releasing a lock of the electronic device 101. However, it is not limited thereto. The electronic device 101 may obtain the reference data by using the second software module 751.

In operation 711, after the reference data is provided to the electronic device 101, the second software module 751 of the electronic device 101 and the second software module 753 of the other electronic device 102 may execute an operation for transmitting the account information. The operation will be described in detail with reference to FIG. 8.

Figure 8:
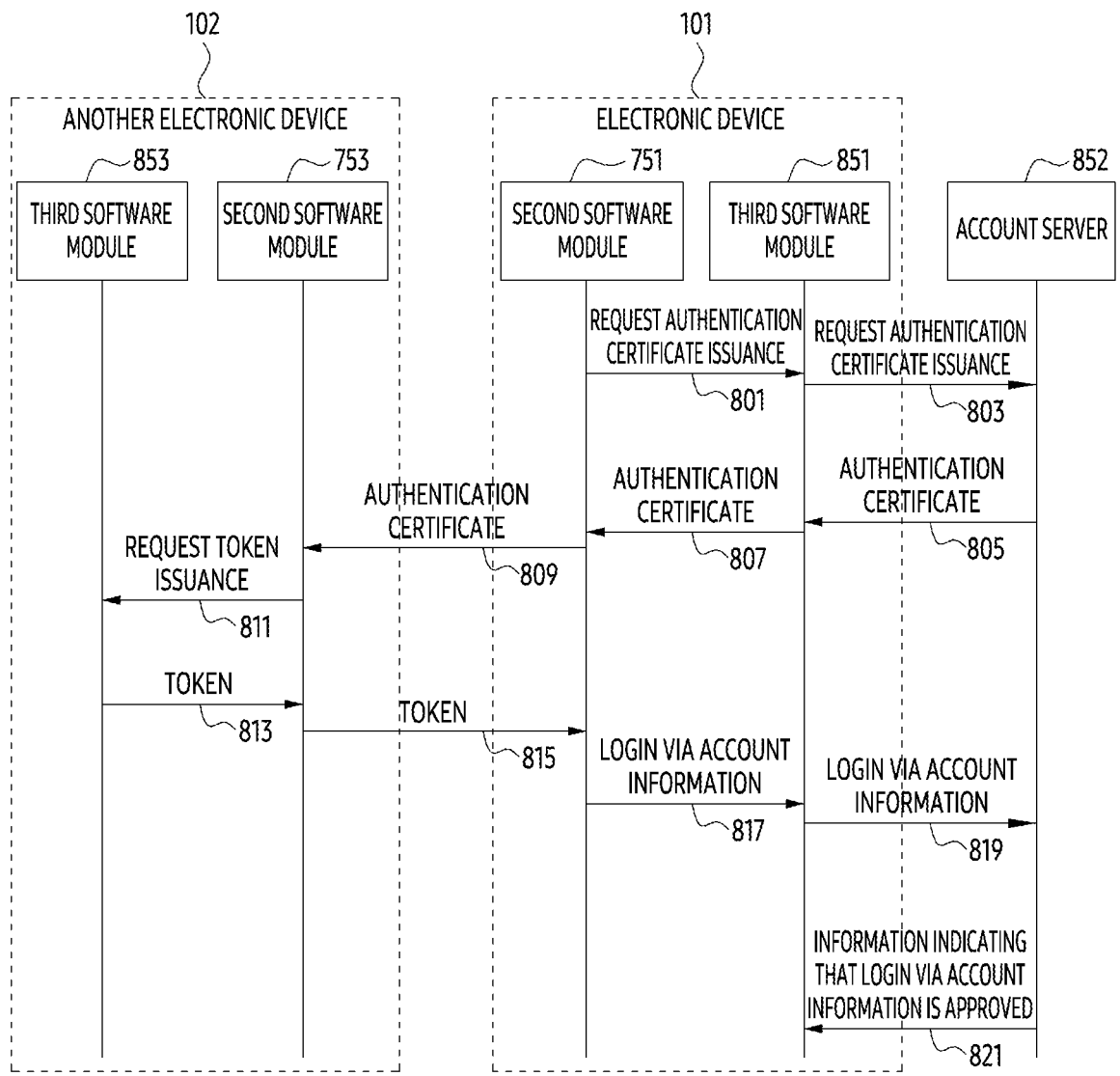
FIG. 8 illustrates an example of signaling between an electronic device and another electronic device for transmitting account information according to an example embodiment.

FIG. 8 illustrates an example of signaling between an electronic device and another electronic device for transmitting account information according to an embodiment. These signaling may occur between the electronic device 101 and the electronic device 102 (hereinafter, referred to as another/other electronic device 102) illustrated in FIG. 1. For example, the at least one processor 120 of the electronic device 101 may execute one or more of operations 801, 803, 805, 807, 809, 815, 817, 819, and 821, through the second software module 751 and/or the third software module 851. For example, the at least one processor of the other electronic device 102 may execute one or more of operations 809, 811, 813, and 815, through the second software module 753 and/or the third software module 853.

Referring to FIG. 8, in operation 801, the second software module 751 of the electronic device 101 may request the third software module 851 to issue an authentication certificate for obtaining or using the account information, after the other electronic device 102 is authenticated and the user is authenticated, in order to obtain the account information from the other electronic device 102. For example, the third software module 851 may be stored in the electronic device 101 for managing the user's account used in the electronic device 101 and/or the account of the electronic device 101. For example, the third software module 851 may be an API or a software application. However, it is not limited thereto.

In operation 803, the third software module 851 may request the issuance of the authentication certificate to an account server 852 providing a service related to the account information.

In operation 805, the account server 852 may provide the authentication certificate to the electronic device 101 in response to the request. For example, the authentication certificate may be used to issue or generate a token within the other electronic device 102. However, it is not limited thereto. For example, the electronic device 101 may obtain the authentication certificate by using the third software module 851.

In operation 807, the third software module 851 may provide the authentication certificate to the second software module 751. For example, the third software module 851 may transmit the authentication certificate to the second software module 751 in order to transmit the authentication certificate to the other electronic device 102.

In operation 809, the second software module 751 may provide the authentication certificate to the other electronic device 102. The other electronic device 102 may obtain the authentication certificate by using the second software module 753.

In operation 811, the second software module 753 may request the third software module 853 to issue or generate a token based on the authentication certificate. For example, the token may be used by the electronic device 101 to log in by using the account information received from the other electronic device 102. In an embodiment, the second software module 753 may provide the third software module 853 with the result of the authentication of the user executed through operation 509 together with the request.

For example, the third software module 853 may obtain the request. For example, the third software module 853 may be stored in the other electronic device 102 for managing the user's account used in the other electronic device 102 and/or the account of the other electronic device 102. For example, the third software module 853 may be an API or a software application. However, it is not limited thereto.

For example, the third software module 853 may generate or issue the token in response to the request. For example, the third software module 853 may identify the result of the authentication obtained together with the request as authenticating the user, and generate or issue the token based on the identification.

In operation 813, the third software module 853 may provide the generated or issued token to the second software module 753. The second software module 753 may obtain the token from the third software module 853.

In operation 815, the second software module 753 may provide the token to the electronic device 101. The electronic device 101 may obtain the token by using the second software module 751.

In operation 817, the second software module 751 may request the third software module 851 to log in through the account information obtained from the other electronic device 102, based on the token. The third software module 851 may obtain the request from the second software module 751.

In operation 819, the third software module 851 may request the account server 852 to log in through the account information by using the token, in response to the request. The account server 852 may obtain the request from the third software module 851. The account server 852 may identify whether the token is a valid token in response to the request.

For example, the account server 852 may approve the login through the account information on a condition that the token is valid, or otherwise not approve the login.

In operation 821, the account server 852 may provide information indicating that the login is approved through the account information to the electronic device 101 on a condition for authorizing the login. The electronic device 101 may obtain the information by using the third software module 851.

Although not illustrated in FIG. 8, in an embodiment, the third software module 851 may provide the information to the second software module 751 so that the initial setup of the electronic device 101 may be performed based on the login of the account information. However, it is not limited thereto.

Figure 9:
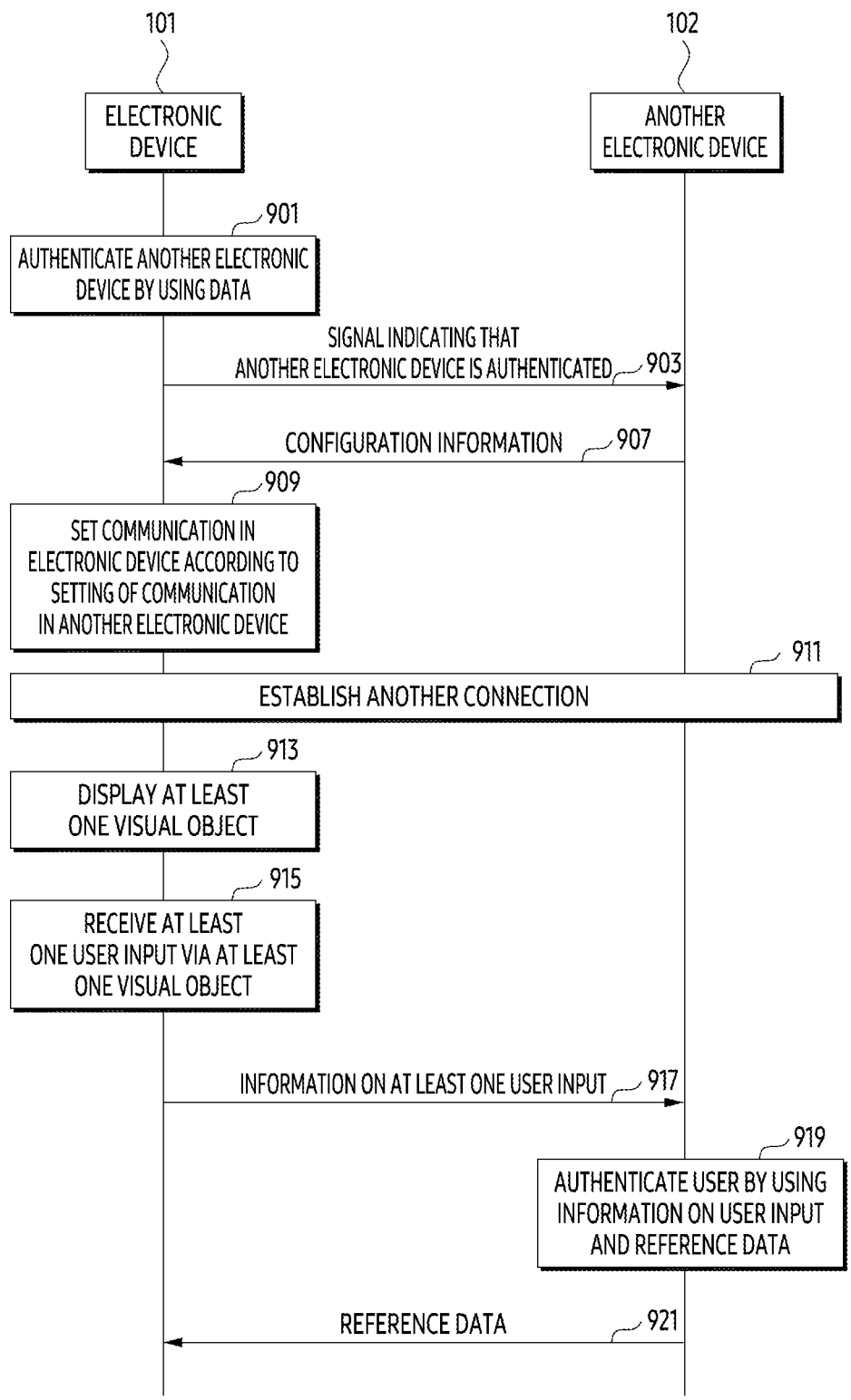
FIG. 9 illustrates an example of signaling between an electronic device and another electronic device for authenticating a user after establishing another connection according to an example embodiment.

FIG. 9 illustrates an example of signaling between an electronic device and another electronic device for authenticating a user after establishing another connection according to an embodiment. These signaling may occur between the electronic device 101 and the electronic device 102 (hereinafter, referred to as another/other electronic device 102) illustrated in FIG. 1. For example, when instructions stored in the memory 130 of the electronic device 101 are executed, the at least one processor 120 of the electronic device 101 may be configured to execute one or more of operations 901, 903, 907, 909, 911, 913, 915, 917, and 921. For example, when instructions stored in the memory of the other electronic device 102 are executed, the at least one processor of the other electronic device 102 may be configured to execute one or more of operations 903, 907, 911, 917, 919, and 921.

Referring to FIG. 9, in operation 901, the electronic device 101 may authenticate the other electronic device 102 by using the data received from the other electronic device 102 through operation 213 of FIG. 2. For example, operation 901 may correspond to operation 215 of FIG. 2.

In operation 903, the electronic device 101 may transmit a signal indicating that the other electronic device 102 is authenticated to the other electronic device 102. The other electronic device 102 may receive the signal from the electronic device 101. For example, operation 903 may correspond to operation 217 of FIG. 2.

In operation 907, the other electronic device 102 may transmit configuration information for communication through the second communication scheme to the electronic device 101 based on the reception of the signal. For example, the other electronic device 102 may include, based on the reception of the signal, the configuration information within the at least one signal, and transmit the at least one signal including the configuration information to the electronic device 101. For example, the at least one signal may be the third signal. In an embodiment, in operation 907, the other electronic device 102 may further transmit the first signal that includes the information indicating whether the scheme for authentication of the user who releases the lock state of the other electronic device 102 is enabled in the other electronic device 102, to the electronic device 101. In an embodiment, the first signal and the third signal may be transmitted to the electronic device 101 as a single signal. However, it is not limited thereto.

In an embodiment, the configuration information may be encrypted based on the information on the barcode, which is obtained based on scanning the barcode. In an embodiment, the other electronic device 102 may transmit the encrypted configuration information to the electronic device 101.

Meanwhile, the electronic device 101 may receive the configuration information from the other electronic device 102.

In operation 909, the electronic device 101 may set the communication in the electronic device 101 according to the setting of the communication through the second communication scheme in the other electronic device 102 based on the configuration information. In an embodiment, the configuration information may include data for connecting or accessing an external electronic device to which the other electronic device 102 was connected according to the second communication scheme. For example, the configuration information may include authentication data such as address data (or identification data) of the external electronic device and/or password required for connection or access to the external electronic device. For example, the electronic device 101 may set the communication in the electronic device 101 according to the setting of the communication through the second communication scheme in the other electronic device 102 by registering the address data and the authentication data in the electronic device 101. However, it is not limited thereto.

In an embodiment, the configuration information may include data for connecting or accessing to the other electronic device 102 according to the second communication scheme. For example, the electronic device 101 may set the communication in the electronic device 101 according to the setting of the communication through the second communication scheme in the other electronic device 102 by registering the data in the electronic device 101. However, it is not limited thereto.

In an embodiment, on a condition that the configuration information is encrypted based on the information on the barcode, the electronic device 101 may decrypt the encrypted configuration information by using the information on the barcode, and then execute operation 909 based on the decryption. However, it is not limited thereto.

In operation 911, the electronic device 101 may establish the other connection with the other electronic device 102 based on the communication set based on the configuration information. In an embodiment, the other connection may be a direct connection between the electronic device 101 and the other electronic device 102. For example, the other connection may be a Wi-Fi direct connection. For example, a throughput of the other connection may be greater than a throughput of the connection established through operation 209 of FIG. 2. For example, since the electronic device 101 is within a state in which the authentication of the other electronic device 102 is completed, the electronic device 101 may establish the other connection in operation 911, in order to obtain a larger amount of received data (e.g., at least one signal) from the other electronic device 102. For example, the electronic device 101 may establish the other connection to complete the initial setup more quickly.

In operation 913, after the other connection is established, the electronic device 101 may display the at least one visual object defined through the description of FIGS. 5 and 6. For example, in operation 907, the electronic device 101 may display the at least one visual object, on a condition that the information is obtained from the other electronic device 102 to indicate whether the scheme for the authentication of the user who releases the lock state of the other electronic device 102 is enabled within the other electronic device 102. For example, operation 913 may correspond to operation 503 of FIG. 5.

In operation 915, the electronic device 101 may receive at least one user input through the at least one visual object. For example, operation 915 may correspond to operation 505 of FIG. 5.

In operation 917, the electronic device 101 may transmit information on the at least one user input to the other electronic device 102 based on the at least one user input. For example, the information on the at least one user input may be transmitted to the other electronic device 102 through the other connection established in operation 911. For example, the other electronic device 102 may receive the information from the electronic device 101.

In operation 919, the other electronic device 102 may authenticate the user by using the information on the user input and the reference data. For example, operation 919 may correspond to operation 509 of FIG. 5.

In operation 921, the other electronic device 102 may transmit the reference data to the electronic device 101 on a condition that authenticates the user. For example, the reference data may be transmitted to the electronic device 101 through the other connection established through operation 911. Meanwhile, the electronic device 101 may receive the reference data from the other electronic device 102 through the other connection.

As described above, the electronic device 101 may establish the other connection with the other electronic device 102 before the at least one user input for authenticating the user is received, and transmit the information on the at least one user input to the other electronic device 102 through the other connection. Since the throughput of the other connection is larger than the throughput of the connection established through operation 209 of FIG. 2, the electronic device 101 may provide the initial setup with a faster response speed. For example, the electronic device 101 may execute the initial setup at a faster response speed than an electronic device (e.g., an electronic device distinct from the electronic device 101) that performs the initial setup based on establishing a connection with an external electronic device (e.g., an electronic device distinct from the other electronic device 102) according to the second communication scheme after at least one of the user input is received.

Figure 10:
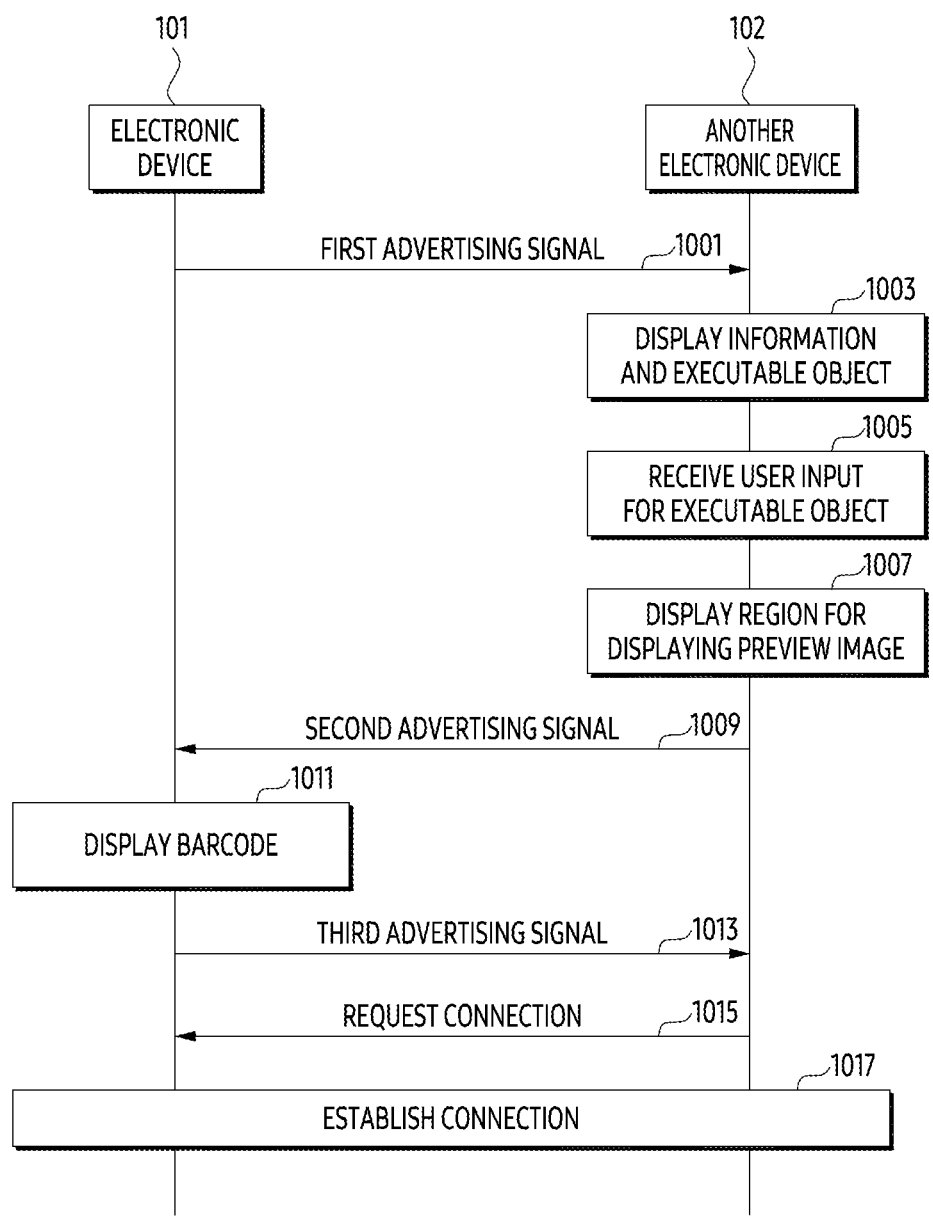
FIG. 10 illustrates an example of signaling between an electronic device and another electronic device for establishing a connection with the other electronic device after displaying a barcode according to an example embodiment.

FIG. 10 illustrates an example of signaling between an electronic device and another electronic device for establishing a connection with the other electronic device after displaying a barcode according to an embodiment. These signaling may occur between the electronic device 101 and the electronic device 102 (hereinafter, referred to as another/other electronic device 102) illustrated in FIG. 1. For example, when instructions stored in the memory 130 of the electronic device 101 are executed, the at least one processor 120 of the electronic device 101 may be configured to execute one or more of operations 1001, 1009, 1011, 1013, 1015, and 1017. For example, when instructions stored in the memory of another electronic device 102 are executed, the at least one processor of the other electronic device 102 may be configured to execute one or more of operations 1001, 1003, 1005, 1007, 1009, 1013, 1015, and 1017.

Referring to FIG. 10, in operation 1001, the electronic device 101 may broadcast a first advertising signal. For example, the first advertising signal may be broadcasted according to the first communication scheme. For example, the first advertising signal may indicate that the initial setup of the electronic device 101 is initiated. For example, the first advertising signal may be broadcasted while the second display state 320 is provided. For example, the first advertising signal may be broadcasted in response to a user input to the executable object 312 provided in the first display state 310. However, it is not limited thereto.

In an embodiment, the first advertising signal may be broadcasted with a transmission power lower than that of another advertising signal broadcasted from the electronic device 101 according to the first communication scheme after the initial setup is completed. For example, the first advertising signal may be broadcasted with the transmission power lower than the transmission power of the other advertising signals in order to reduce the number of external electronic devices capable of receiving the first advertising signal. For example, the first advertising signal may be broadcasted with the transmission power lower than the transmission power of the other advertising signals in order to enhance the security of the initial setup. However, it is not limited thereto.

Meanwhile, the other electronic device 102 may receive the first advertising signal.

In operation 1003, in response to the reception of the first advertising signal, the other electronic devices 102 may display information and executable objects that guide the other electronic devices 102 to be adjacent to the electronic devices 101 within the user interface for assisting the initial setup. For example, the information may be the information 412 of FIG. 4. However, it is not limited thereto. For example, the executable object may be displayed within the user interface to execute enabling of the camera of another electronic device 102 to assist the initial setup. For example, the executable object may be the executable object 413 of FIG. 4. However, it is not limited thereto.

In operation 1005, the other electronic device 102 may receive a user input for the executable object.

In operation 1007, the other electronic device 102 may display the region for displaying a preview image obtained through the camera enabled in response to the user input within the user interface. For example, referring to FIG. 4, the other electronic device 102 may change the first display state 400 to the second display state 420 in response to the user input to the executable object 413. For example, the region may be a region 422. However, it is not limited thereto.

Referring back to FIG. 10, operation 1007 may correspond to operation 203 of FIG. 2.

In operation 1009, the other electronic device 102 may broadcast a second advertising signal after the region is displayed or after the user input is received. For example, the second advertising signal may be broadcasted according to the first communication scheme. For example, the second advertising signal may indicate that the camera of the other electronic device 102 is enabled. For example, the second advertising signal may be broadcasted while the second display state 420 is provided. For example, the second advertising signal may be broadcasted in response to a user input to the executable object 413 in the first display state. However, it is not limited thereto.

In an embodiment, after the initial setup is completed or before the initial setup is initiated, the second advertising signal may be broadcasted with a transmission power lower than that of another advertising signal broadcasted from the other electronic device 102 according to the first communication scheme. For example, the second advertising signal may be broadcasted with the transmission power lower than the transmission power of the other advertising signal in order to reduce the number of external electronic devices capable of receiving the second advertising signal. For example, the second advertising signal may be broadcasted with the transmission power lower than the transmission power of the other advertising signals in order to enhance the security of the initial setup. However, it is not limited thereto.

Meanwhile, the electronic device 101 may receive the second advertising signal.

In operation 1011, the electronic device 101 may display the barcode within the user interface in response to the reception of the second advertising signal. For example, operation 1011 may correspond to operation 201 of FIG. 2.

In operation 1013, the electronic device 101 may broadcast a third advertising signal in response to the display of the barcode. For example, the third advertising signal may be the signal broadcasted in operation 205 of FIG. 2. For example, the third advertising signal may be broadcasted according to the first communication scheme. For example, the third advertising signal may be broadcasted while the third display state 330 is provided. For example, the third advertising signal may be broadcasted in response to the reception of the second advertising signal. However, it is not limited thereto.

In an embodiment, the third advertising signal may include information for connection with the electronic device 101. For example, the third advertising signal may include information of the electronic device 101. For example, the information may include identification information of the electronic device 101. However, it is not limited thereto. In an embodiment, the third advertising signal may include a unique identifier. For example, the unique identifier may be obtained based on a hash function.

In an embodiment, the third advertising signal may be broadcasted with a transmission power lower than that of another advertising signal broadcasted from the electronic device 101 according to the first communication scheme after the initial setup is completed. For example, the third advertising signal may be broadcasted with the transmission power lower than the transmission power of the other advertising signals in order to reduce the number of external electronic devices capable of receiving the third advertising signal. For example, the third advertising signal may be broadcasted with the transmission power lower than the transmission power of the other advertising signals in order to enhance the security of the initial setup. However, it is not limited thereto.

Meanwhile, the other electronic device 102 may receive the third advertising signal.

In operation 1015, the other electronic device 102 may request a connection to the electronic device 101 based on the third advertising signal. For example, operation 1015 may correspond to operation 207 of FIG. 2. For example, the electronic device 101 may receive the request from the other electronic device 102.

In operation 1017, the electronic device 101 and the other electronic device 102 may establish the connection based on the request. For example, operation 1017 may correspond to operation 209 of FIG. 2.

FIG. 10 illustrates operations that the other electronic device 102 broadcasts a second advertising signal after activating the camera for scanning the barcode, and the electronic device 101 displays the barcode in response to reception of the second advertising signal, but these operations may be replaced by other operations according to embodiments. For example, the electronic device 101 may display the barcode as in operation 1011, in response to broadcasting the first advertising signal in operation 1001. the electronic device 101 may broadcast another advertising signal distinct from the first advertising signal in response to displaying the barcode. For example, the other advertising signal may correspond to the third advertising signal. However, it is not limited thereto. Meanwhile, the other electronic device 102 may activate the camera and display a region for displaying the preview image within the user interface in response to receiving the other advertising signal. The other electronic device 102 may request a connection to the electronic device 101 based on the third advertising signal as in operation 1015, in response to the display of the region. The electronic device 101 and the other electronic device 102 may establish the connection based on the request of the other electronic device 102. However, it is not limited thereto.

As described above, before the connection is established in operation 1017, the electronic device 101 may prepare the authentication of the other electronic device 102 for the initial setup by using transmission and reception of advertising signals. In other words, the electronic device 101 may enhance the security of the initial setup and enhance the convenience of the initial setup.

Figure 11:
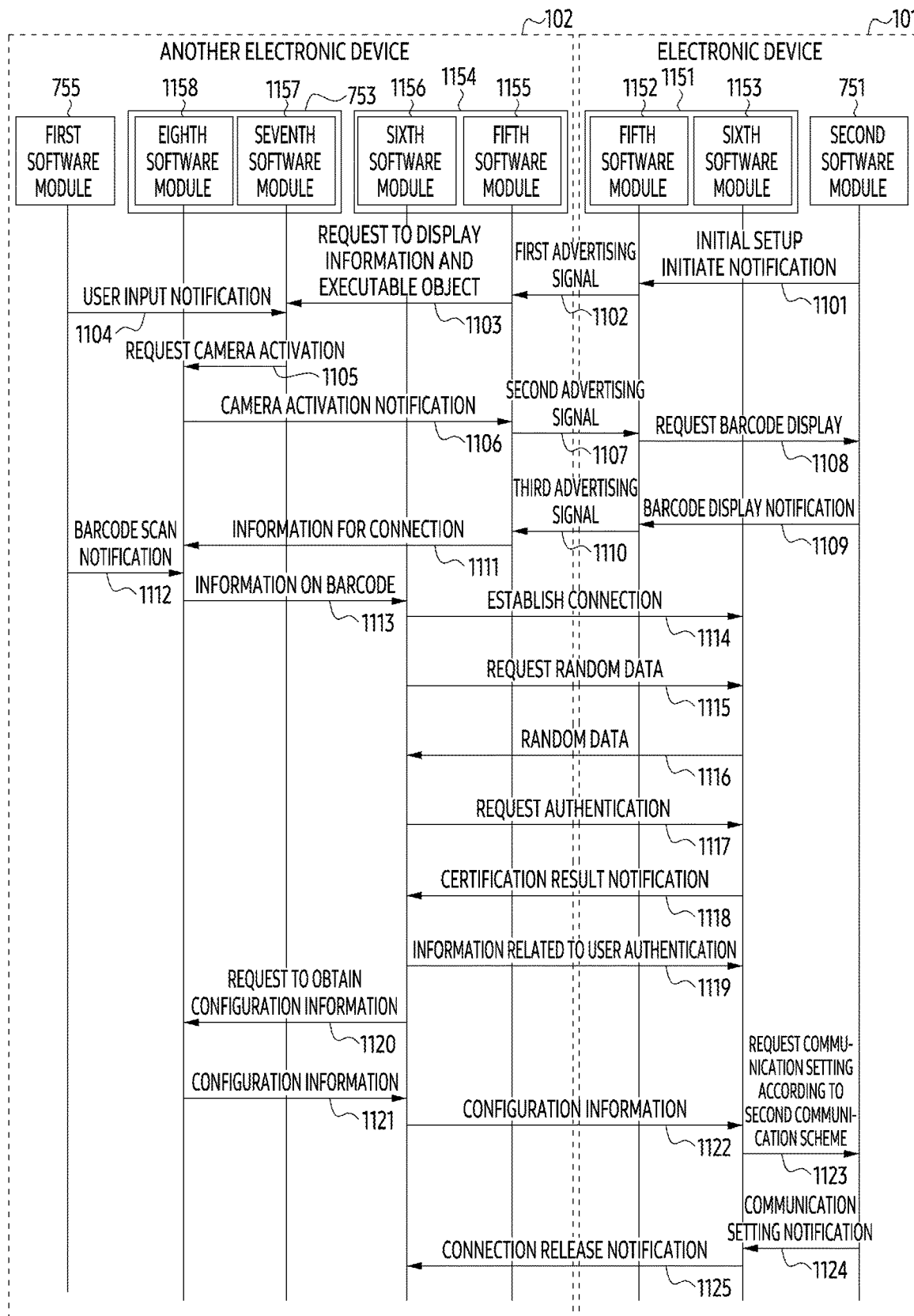
FIG. 11 illustrates an example of signaling between an electronic device and another electronic device for establishing and releasing a connection through a first communication scheme according to an example embodiment.

FIG. 11 illustrates an example of signaling between an electronic device and another electronic device for establishing and releasing a connection through a first communication scheme according to an embodiment. These signaling may occur between the electronic device 101 and the electronic device 102 (hereinafter, referred to as another/other electronic device 102) illustrated in FIG. 1. For example, the at least one processor 120 of the electronic device 101 may execute operations. For example, the at least one processor 120 of the electronic device (101) may execute one or more of operations 1101, 1102, 1107, 1108, 1109, 1110, 1114, 1115, 1116, 1117, 1118, 1119, 1122, 1123, 1124, and 1125, through the second software module 751 and the fourth software module 1151 (including the fifth software module 1152 and the sixth software module 1153). For example, the at least one processor of another electronic device 102 may execute one or more of operations 1102, 1103, 1104, 1105, 1106, 1107, 1110, 1111, 1112, 1113, 1114, 1115, 1116, 1117, 1118, 1119, 1120, 1121, 1122, and 1125, through the first software module 755, the second software module 753 (including the seventh software module 1157 and the eighth software module 1158), and the fourth software module 1154 (including the fifth software module 1155 and the sixth software module 1156).

Referring to FIG. 11, in operation 1101, the second software module 751 may inform the fifth software module 1152 in the fourth software module 1151 of the initial setup of the electronic device 101. For example, the fourth software module 1151 may be a module for the first communication scheme. For example, the fifth software module 1152 may be used for transmitting a signal before connection with an external electronic device (e.g., another electronic device 102). For example, the fifth software module 1152 may be used to transmitting advertising signals. For example, the fifth software module 1152 may obtain the notification of the initial setup.

In operation 1102, the fifth software module 1152 may broadcast the first advertising signal. For example, the first advertising signal may be the first advertising signal broadcasted in operation 1001. The other electronic device 102 may receive the first advertising signal by using the fifth software module 1155 in the fourth software module 1154.

In operation 1103, the fifth software module 1155 may request the seventh software module 1157 in the second software module 753 to display the information and the executable object described through operation 1003 of FIG. 10, in response to the reception of the first advertising signal.

For example, the seventh software module 1157 may display the information and the executable object in response to obtaining of the request.

In operation 1104, the first software module 755 may notify the seventh software module 1157 that the user input for the executable object described through operation 1005 of FIG. 10 is received. The seventh software module 1157 may obtain the notification.

In operation 1105, the seventh software module 1157 may request the eighth software module 1158 in the second software module 753 to activate the camera of the other electronic device 102. The eighth software module 1158 may obtain the request from the seventh software module 1157. The eighth software module 1158 may activate the camera in response to the request.

In operation 1106, the eighth software module 1158 may inform the fifth software module 1155 that the camera is activated. The fifth software module 1155 may obtain the notification from the eighth software module 1158.

In operation 1107, the fifth software module 1155 may broadcast the second advertising signal, such as operation 1009, in response to the notification. The electronic device 101 may receive the second advertising signal by using the fifth software module 1152.

In operation 1108, the fifth software module 1152 may request the second software module 751 to display a barcode in response to the reception of the second advertising signal. The second software module 751 may obtain the request from the fifth software module 1152. In response to the request, the second software module 751 may display the barcode within the user interface as shown in operation 201 of FIG. 2.

In operation 1109, the second software module 751 may notify the fifth software module 1152 that the barcode is displayed. The fifth software module 1152 may obtain the notification from the second software module 751.

In operation 1110, the fifth software module 1152 may broadcast the third advertising signal, such as operation 1013, in response to the notification. The other electronic device 102 may receive the third advertising signal by using the fifth software module 1155. For example, the third advertising signal may include information for connection to the electronic device 101.

In operation 1111, the fifth software module 1155 may provide the information for the connection to the eighth software module 1158 in response to the reception of the third advertising signal. The eighth software module 1158 may obtain the information from the fifth software module 1155.

Meanwhile, in operation 1112, the first software module 755 may notify to the eighth software module 1158 that the barcode displayed through the display of the electronic device 101 is scanned. The eighth software module 1158 may obtain the notification from the first software module 755.

In operation 1113, the eighth software module 1158 may obtain the information on the barcode by parsing the barcode based on the scan, and provide the information on the barcode to the sixth software module 1156. In an embodiment, the eighth software module 1158 may provide the information for the connection to the sixth software module 1156. The sixth software module 1156 may obtain the information on the barcode from the eighth software module 1158. The sixth software module 1156 may obtain the information for the connection from the eighth software module 1158.

In operation 1114, the sixth software module 1156 may establish the connection with the electronic device 101 based on the information for the connection. For example, the sixth software module 1156 may establish the connection through interworking with the sixth software module 1153 in the electronic device 101.

In operation 1115, the sixth software module 1156 may request random data to the electronic device 101 after the connection is established or based on the connection. For example, the electronic device 101 may obtain the request by using the sixth software module 1153. The random data will be described in detail with reference to FIG. 13.

In operation 1116, the sixth software module 1153 may provide the random data to the other electronic device 102 in response to the request. For example, the other electronic device 102 may obtain the random data by using the sixth software module 1156.

In operation 1117, the sixth software module 1156 may request authentication of the other electronic device 102 to the electronic device 101 through the random data and the data obtained based on the scan (e.g., the data in operation 213 of FIG. 2). The electronic device 101 may obtain the request through the sixth software module 1153. The electronic device 101 may authenticate the other electronic device 102 based on the data.

In operation 1118, the sixth software module 1153 may notify the other electronic device 102 of the result of the authentication. For example, the other electronic device 102 may obtain the notification by using the sixth software module 1156.

In operation 1119, the sixth software module 1156 may provide the electronic device 101 with information related to the authentication of the user used to release the lock state of the other electronic device 102 on a condition that the result of the authentication authenticates the other electronic device 102. For example, the information may indicate whether the scheme for authentication of the user who releases the lock state of the other electronic device 102 is activated in the other electronic device 102. However, it is not limited thereto.

In operation 1120, the sixth software module 1156 may request the eighth software module 1158 to obtain the configuration information as shown in operation 907 of FIG. 9. The eighth software module 1158 may obtain the request from the sixth software module 1156. The eighth software module 1158 may obtain the configuration information in response to the request.

In operation 1121, the eighth software module 1158 may provide the configuration information to the sixth software module 1156. The sixth software module 1156 may obtain the configuration information from the eighth software module 1158.

In operation 1122, the sixth software module 1156 may provide the configuration information to the electronic device 101. The electronic device 101 may receive the configuration information by using the sixth software module 1153.

In operation 1123, the sixth software module 1153 may request the second software module 751 to set communication according to the second communication scheme through transmission of the configuration information. The second software module 751 may obtain the request from the sixth software module 1153. The second software module 751 may set the communication based on the configuration information. For example, the setting of the communication may correspond to operation 909.

In operation 1124, the second software module 751 may notify the sixth software module 1153 that the communication is set in response to the setting. The sixth software module 1153 may obtain the notification from the second software module 751.

In operation 1125, the sixth software module 1153 may release the connection with the other electronic device 102 according to the first communication scheme in response to the notification. In an embodiment, the sixth software module 1153 may notify the other electronic device 102 of the release of the connection. The other electronic device 102 may obtain the notification by using the sixth software module 1156.

Figure 12:
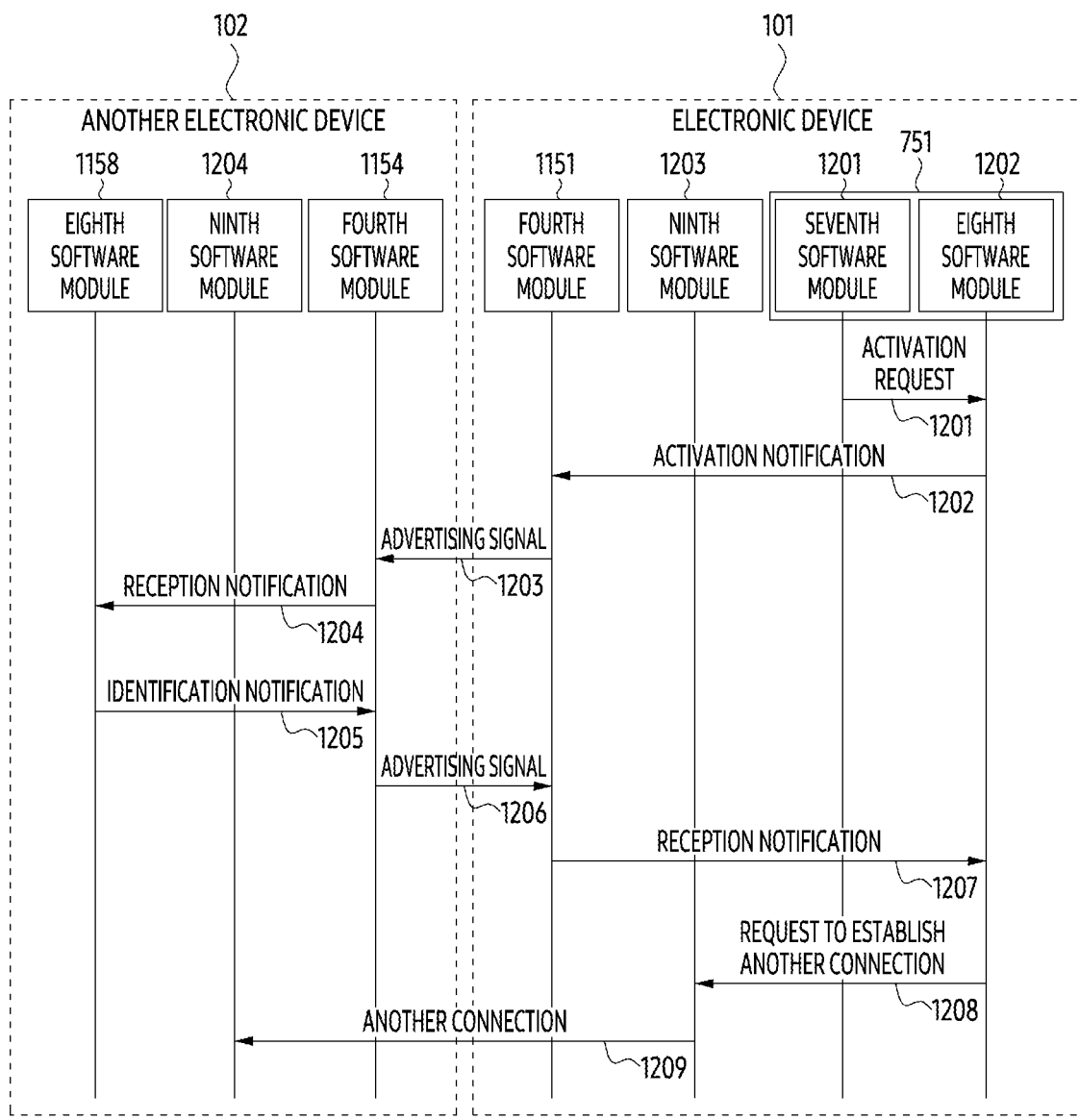
FIG. 12 illustrates an example of signaling between an electronic device and another electronic device for establishing another connection through a second communication scheme according to an example embodiment.

FIG. 12 illustrates an example of signaling between an electronic device and another electronic device for establishing another connection through a second communication scheme according to an embodiment. These signaling may occur between the electronic device 101 and the electronic device 102 (hereinafter, referred to as another/other electronic device 102) illustrated in FIG. 1. For example, the at least one processor 120 of the electronic device 101 may execute one or more of operations 1201, 1202, 1203, 1206, 1207, 1208, and 1209, through the second software module 751 (e.g., including the seventh software module 1201 and the eighth software module 1202), the fourth software module 1151 and the ninth software module 1203. For example, the at least one processor of the other electronic device 102 may execute one or more of operations 1203, 1204, 1205, 1206, and 1209, through the fourth software module 1154, the eighth software module 1158, and the ninth software module 1204.

Referring to FIG. 12, in operation 1201, the seventh software module 1201 may request activation (or execution) of the eighth software module 1202. For example, the seventh software module 1201 may request the activation after operation 1125 of FIG. 11 is executed. The eighth software module 1202 may be activated or executed in response to the request.

In operation 1202, the eighth software module 1202 may notify the fourth software module 1151 that the eighth software module 1202 is activated (or executed) in response to the activation or execution. The fourth software module 1151 may obtain the notification.

In operation 1203, the fourth software module 1151 may broadcast an advertising signal. For example, the advertising signal may be broadcasted to establish the other connection through operation 911 of FIG. 9. For example, the advertising signal may include identification information for the other connection. However, it is not limited thereto. Meanwhile, the other electronic device 102 may receive the advertising signal by using the fourth software module 1154.

In operation 1204, the fourth software module 1154 may notify the eighth software module 1158 of the reception of the advertising signal. The eighth software module 1158 may obtain the notification from the fourth software module 1154.

In operation 1205, the eighth software module 1158 may notify the fourth software module 1154 that the notification is obtained, in response to the notification. The fourth software module 1154 may obtain the notification from the eighth software module 1158.

In operation 1206, the fourth software module 1154 may broadcast an advertising signal in response to the notification. For example, the advertising signal may be broadcasted to establish the other connection. For example, the advertising signal may include identification information for the other connection. However, it is not limited thereto. Meanwhile, the electronic device 101 may receive the advertising signal by using the fourth software module 1151.

In operation 1207, the fourth software module 1151 may notify the eighth software module 1202 that the advertising signal is received in response to the reception of the advertising signal. The eighth software module 1202 may obtain the notification from the fourth software module 1151.

In operation 1208, the eighth software module 1202 may request the ninth software module 1203 to establish the other connection. For example, the ninth software module 1203 may be a module for the second communication scheme. For example, the ninth software module 1203 may obtain the request from the eighth software module 1202.

In operation 1209, the ninth software module 1203 may establish the other connection according to the second communication scheme with another electronic device 102 in response to the request. For example, the ninth software module 1203 may be interlocked with the ninth software module 1204 in the other electronic device 102 for the establishment of the other connection. For example, the ninth software module 1203 may be interlocked with the ninth software module 1204 in the other electronic device 102 for the establishment of the other connection.

Although not illustrated in FIG. 12, after operation 1209 is executed, the electronic device 101 may execute operation 913. However, it is not limited thereto.

Figure 13:
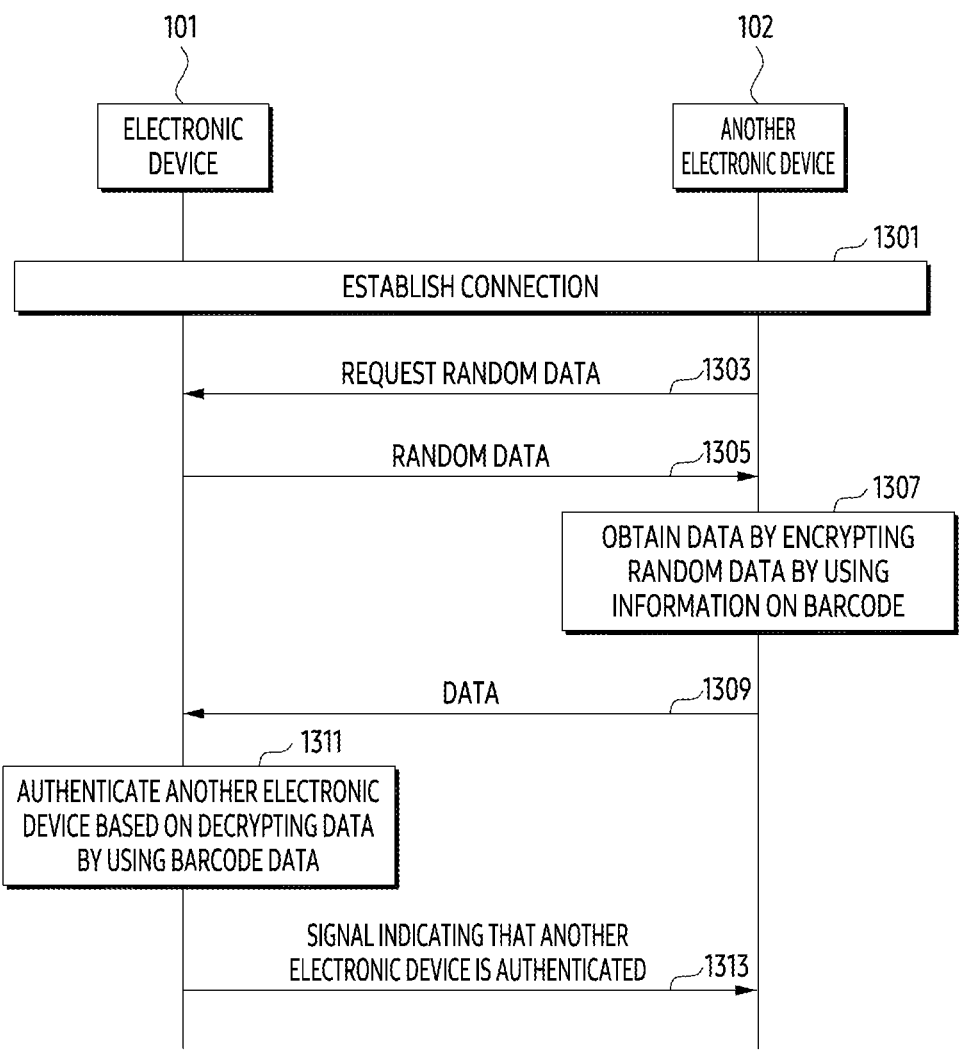
FIG. 13 illustrates an example of signaling between an electronic device and another electronic device for encrypting and decrypting random data based on a scan of a barcode according to an example embodiment.

FIG. 13 illustrates an example of signaling between an electronic device and another electronic device for encrypting and decrypting random data based on a scan of a barcode according to an embodiment. These signaling may occur between the electronic device 101 and the electronic device 102 (hereinafter, referred to as another/other electronic device 102) illustrated in FIG. 1. For example, when instructions stored in the memory 130 of the electronic device 101 are executed, the at least one processor 120 of the electronic device 101 may be configured to execute one or more of operations 1301, 1303, 1305, 1309, 1311, and 1313. For example, when instructions stored in the memory of the other electronic device 102 are executed, the at least one processor of the other electronic device 102 may be configured to execute one or more of operations 1301, 1303, 1305, 1307, 1309, and 1313.

Referring to FIG. 13, in operation 1301, the electronic device 101 and the other electronic device 102 may establish a connection between the electronic device 101 and the other electronic device 102 according to the first communication scheme. For example, operation 1301 may correspond to operation 209 of FIG. 2.

In operation 1303, the other electronic device 102 may request random data to the electronic device 101 in response to the establishment of the connection. For example, the request of the random data may be transmitted from the other electronic device 102 to the electronic device 101 to identify whether the other electronic device 102 on which the connection is established is a device that scanned the barcode. For example, operation 1303 may correspond to operation 1115 of FIG. 11. Meanwhile, the electronic device 101 may receive the request from the other electronic device 102.

In operation 1305, the electronic device 101 may transmit the random data to the other electronic device 102 through the connection in response to the request. For example, the random data may be an object of encryption using the information on the barcode obtained through the scan of the barcode. However, it is not limited thereto. For example, operation 1305 may correspond to operation 1116 of FIG.

11. Meanwhile, the other electronic device 102 may receive the random data from the electronic device 101 through the connection.

In operation 1307, the other electronic device 102 may obtain data by encrypting the random data using the information on the barcode obtained through the scan in response to the reception. For example, the data may be the data obtained through operation 213.

In operation 1309, the other electronic device 102 may transmit the data to the electronic device 101. The electronic device 101 may receive the data from the other electronic device 102. For example, operation 1309 may correspond to operation 213 of FIG. 2. For example, operation 1309 may correspond to operation 1117 of FIG. 11.

In operation 1311, the electronic device 101 may authenticate the other electronic device 102 based on decrypting the data by using data on the barcode. For example, the electronic device 101 may decrypt the data received from the other electronic device 102 by using the data on the barcode displayed through the display of the electronic device 101 as a key. For example, the electronic device 101 may identify whether the result of the decryption corresponds to the random data transmitted in operation 1305, and authenticate the other electronic device 102 as a device for assisting the initial setup based on identifying that the result corresponds to the random data. For example, the electronic device 101 may identify that the other electronic device 102 connected, directly or indirectly, in operation 1301 is a device that scans the barcode displayed through the display of the electronic device 101 on a condition that that the result corresponds to the random data.

In operation 1313, the electronic device 101 may transmit a signal indicating that the other electronic device 102 is authenticated to the other electronic device 102 on a condition that authenticating the other electronic device 102. The other electronic device 102 may receive the signal from the electronic device 101. For example, operation 1313 may correspond to operation 217 of FIG. 2. For example, operation 1313 may correspond to operation 1118 of FIG. 11.

As described above, the electronic device 101 may identify whether the other electronic device 102 connected, directly or indirectly, to the electronic device 101 is a device that scans the barcode based on random data and data on the barcode. The electronic device 101 may enhance the security of the initial setup through such identification.

Figure 14:
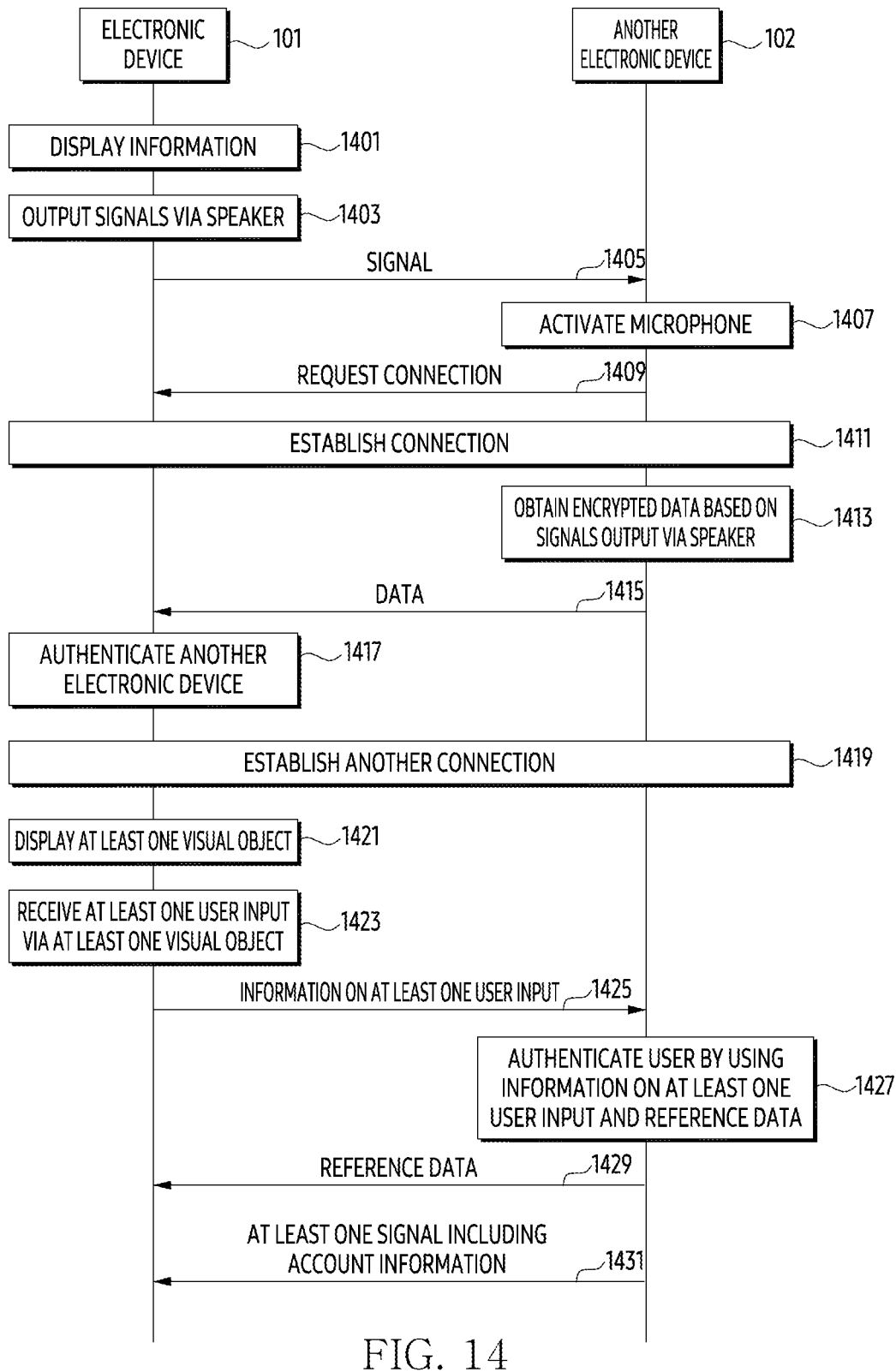
FIG. 14 illustrates an example of signaling between an electronic device and another electronic device for executing an initial setup of the electronic device through assistance of the other electronic device based on signals output through a speaker, according to an example embodiment.

FIG. 14 illustrates an example of signaling between an electronic device and another electronic device for executing an initial setup of the electronic device through assistance of the other electronic device based on signals output through a speaker, according to an embodiment. These signaling may occur between the electronic device 101 and the electronic device 102 (hereinafter, referred to as another/other electronic device 102) illustrated in FIG. 1. For example, when instructions stored in the memory 130 of the electronic device 101 are executed, the at least one processor 120 of the electronic device 101 may be configured to execute one or more of operations 1401, 1403, 1405, 1409, 1411, 1415, 1417, 1419, 1421, 1423, 1425, 1429, and 1431. For example, when instructions stored in the memory of the other electronic device 102 are executed, the at least one processor of the other electronic device 102 may be configured to execute one or more of operations 1405, 1407, 1409, 1411, 1413, 1415, 1419, 1425, 1427, 1429, and 1431.

Referring to FIG. 14, in operation 1401, the electronic device 101 may display information guiding the other electronic device 102 to be adjacent to the electronic device 101, before the connection with the other electronic device 102 to assist the initial setup of the electronic device 101 is established according to the first communication scheme, within the user interface for the initial setup. For example, the information may be displayed for operation 1403.

In operation 1403, the electronic device 101 may output signals through a speaker of the electronic device 101 in response to displaying the information. In an embodiment, the signals may include information used to encrypt data transmitted from the other electronic device 102 for authentication of the other electronic device 102. In an embodiment, the signals may include information used to decrypt the data in the electronic device 101. However, it is not limited thereto.

In an embodiment, each of the signals may be a signal on inaudible frequency range. For example, each of the signals may be a signal on a frequency of substantially 20 hertz (Hz) or less. For example, each of the signals may be a signal on a frequency of substantially 20 kilohertz (kHz) or more. However, it is not limited thereto.

In an embodiment, an output intensity of each of the signals may be less than a reference output intensity. For example, the electronic device 101 may output each of the signals with the output intensity less than the reference output intensity. For example, the electronic device 101 may output each of the signals with the output intensity less than the reference output intensity so that only a device pretty adjacent to the electronic device 101 can receive each of the signals through a microphone. However, it is not limited thereto.

In operation 1405, the electronic device 101 may transmit a signal for notifying the output of the signals to the other electronic device 102 in response to the output of the signals. For example, the signal may be an advertising signal broadcast according to the first communication scheme.

In an embodiment, the transmission power of the signal may be less than the reference transmission power. For example, the electronic device 101 may broadcast the signal with the transmission power less than the reference transmission power so that only the device pretty adjacent to the electronic device 101 can receive the signal. However, it is not limited thereto.

Meanwhile, the other electronic device 102 may receive the signal from the electronic device 101.

In operation 1407, the other electronic device 102 may activate the microphone of the other electronic device 102 in response to the reception of the signal. For example, the microphone may be activated to receive or obtain the signals output through the speaker of the electronic device 101.

In operation 1409, the other electronic device 102 may request a direct connection between the electronic device 101 and the other electronic device 102 to the electronic device 101 in response to the reception of the signal. For example, the direct connection may be requested according to the first communication scheme. In an embodiment, the other electronic device 102 may execute the request based on information for connection with the electronic device 101 included in the signal broadcasted in operation 1405. However, it is not limited thereto.

Meanwhile, the electronic device 101 may receive the request from another electronic device 102.

In operation 1411, the electronic device 101 and the other electronic device 102 may establish the connection according to the first communication scheme based on the request.

In operation 1413, the other electronic device 102 may obtain encrypted data based on the signals output through the speaker. For example, the other electronic device 102 may obtain the signals through the microphone and obtain the encrypted data based on the obtained signals. For example, the other electronic device 102 may obtain the data by identifying timings obtained through the microphone and encrypting the data on the timings by using the signals. However, it is not limited thereto.

FIG. 14 illustrates an example of executing operation 1413 after executing operation 1411, but operation 1413 may be executed substantially simultaneously with operation 1411, or may be executed before operation 1411.

In operation 1415, the other electronic device 102 may transmit the data to the electronic device 101. For example, the data may be transmitted to the electronic device 101 according to the first communication scheme. For example, the data may be transmitted through the connection established in operation 1411. However, it is not limited thereto. Meanwhile, the electronic device 101 may receive the data from the other electronic device 102.

In operation 1417, the electronic device 101 may authenticate the other electronic device 102 based on the data. For example, the electronic device 101 may authenticate the other electronic device 102 as a device for assisting the initial setup by decrypting the data based on the signals output through the speaker. For example, the electronic device 101 may decrypt the data based on the signals and identify whether the timings identified by the decrypting correspond to at least part of the timings output the signals through the speaker. The electronic device 101 may authenticate the other electronic device 102 on a condition that the timings identified by the decrypting correspond to at least part of the timings output through the speaker.

In operation 1419, the electronic device 101 and the other electronic device 102 may establish another connection between the electronic device 101 and the other electronic device 102 based on the second communication scheme having a throughput greater than a throughput of the first communication scheme.

In operation 1421, the electronic device 101 may display at least one visual object that guides the user's authentication for releasing the lock state of the other electronic device 102 within the user interface, after the other connection above is established. For example, the at least one visual object may be the same as or similar to the at least one visual object exemplified through the description of FIGS. 5 and 6.

In operation 1423, the electronic device 101 may receive at least one user input through the at least one visual object.

In operation 1425, the electronic device 101 may transmit information on the at least one user input to the other electronic device 102 through the other connection established in operation 1419 according to the second communication scheme. The other electronic device 102 may receive the information from the electronic device 101.

In operation 1427, the other electronic device 102 may authenticate the user of electronic device 101 by using the information on at least one user input and reference data registered to release the lock state of the other electronic device 102 (e.g., the reference data defined by the description in FIG. 2).

In operation 1429, the other electronic device 102 may transmit the reference data to the electronic device 101 through the other connection established in operation 1419 on a condition that authenticates the user. The electronic device 101 may receive the reference data through the other connection.

For example, the electronic device 101 may restore a user environment related to the lock state of the other electronic device 102 in the electronic device 101 based on the reference data. However, it is not limited thereto.

In operation 1431, the other electronic device 102 may transmit at least one signal including the account information of the user registered in the other electronic device 102 to the electronic device 101, according to the second communication scheme, after the user is authenticated. The electronic device 101 may receive the at least one signal from another electronic device 102. For example, the electronic device 101 may execute the initial setup based on the account information. For example, the initial setup may include migrating at least a part of the user environment in the other electronic device 102 to the electronic device 101.

As described above, the electronic device 101 may provide a service for completing initial setup with a simplified user input within an enhanced security environment by using signals output through the speaker of the electronic device 101, a first connection (e.g., the connection) through the first communication circuit of the electronic device 101, and a second connection (e.g., the other connection) through the second communication circuit of the electronic device 101.

An electronic device, a method, and/or a non-transitory computer-readable storage medium according to an embodiment may provide a simplified initial setup based on assistance of another electronic device authenticated through communication linked with use of visual information such as a barcode.

As described above, according to an embodiment, an electronic device may comprise at least one communication circuit; a display; a memory configured to store instructions; and a processor, operably coupled, directly or indirectly, with the memory, the at least one communication circuit, and the display. Wherein the processor may be, when the instructions are executed, configured to display, before a connection with another electronic device for assisting an initial setup of the electronic device is established, a barcode for authenticating the other electronic device in a user interface for the initial setup. Wherein the processor may be, when the instructions are executed, configured to establish, in response to a request of the connection, the connection, the request transmitted to the electronic device from the other electronic device based on a signal broadcasted from the electronic device. Wherein the processor may be, when the instructions are executed, configured to receive, via the connection from the other electronic device, data that is encrypted based on scan of the barcode through a camera of the other electronic device. Wherein the processor may be, when the instructions are executed, configured to execute the initial setup based on at least one signal received from the other electronic device after authenticating the other electronic device by using the data.

In an embodiment, wherein the processor may be, when the instructions are executed, configured to display, after authenticating the other electronic device, at least one visual object that guides authentication of a user for releasing a lock state of the other electronic device, in the user interface. In an embodiment, wherein the processor may be, when the instructions are executed, configured to transmit, to the other electronic device, information on at least one the user input received via the at least one visual object. In an embodiment, wherein the processor may be, when the instructions are executed, configured to receive the at least one signal including account information of the user that is transmitted from the other electronic device based at least in part on authenticating the user in the other electronic device by using the information on the at least one user input.

In an embodiment, wherein the connection may be established via a first communication scheme. In an embodiment, wherein the processor may be, when the instructions are executed, configured to receive, from the other electronic device via the connection, the at least one signal including configuration information for communication via a second communication scheme distinct from the first communication scheme, before the at least one visual object is displayed, the configuration information stored in the other electronic device. In an embodiment, wherein the processor may be, when the instructions are executed, configured to set the communication in the electronic device according setting in the other electronic device, based on the configuration information. In an embodiment, wherein the processor may be, when the instructions are executed, configured to establish another connection with the other electronic device, based on the set communication. In an embodiment, wherein the processor may be, when the instructions are executed, configured to display the at least one visual object, after the other connection is established. In an embodiment, wherein the processor may be, when the instructions are executed, configured to transmit the information on the at least one user input to the other electronic device via the other connection.

In an embodiment, wherein the at least one signal including the configuration information may further include information indicating whether a scheme for the authentication of the user guided by the at least one visual object is enabled.

In an embodiment, wherein the processor may be, when the instructions are executed, further configured to receive reference data for the authentication of the user, before receiving the at least one signal including the account information, the reference data transmitted via the other connection from the other electronic device based on authenticating the user by using the information on the at least one user input in the other electronic device. In an embodiment, wherein the reference data may be data registered for executing the authentication in the other electronic device. In an embodiment, wherein the reference data may be transmitted from the other electronic device to the electronic device for executing the authentication in the electronic device.

In an embodiment, wherein the processor may be, when the instructions are executed, configured to broadcast, while the user interface is displayed, a first advertising signal indicating that the initial setup is initiated. In an embodiment, wherein the processor may be, when the instructions are executed, configured to receive a second advertising signal broadcasted from the other electronic device in response to enabling the camera in the other electronic device based at least in part on the first advertising signal. In an embodiment, wherein the processor may be, when the instructions are executed, configured to display, in response to the second advertising signal, the barcode in the user interface.

In an embodiment, wherein the signal may be broadcasted from the electronic device to indicate that the barcode is displayed, and includes information for the connection. In an embodiment, wherein the processor may be, when the instructions are executed, configured to broadcast, in response to the display of the barcode, a third advertising signal that is the signal. In an embodiment, wherein the processor may be, when the instructions are executed, configured to receive the request transmitted from the other electronic device based on the information for the connection. In an embodiment, wherein the processor may be, when the instructions are executed, configured to establish, in response to the request, the connection.

In an embodiment, wherein the processor may be, when the instructions are executed, configured to receive, in response to the establishment of the connection, a request of random data via the connection from the other electronic device. In an embodiment, wherein the processor may be, when the instructions are executed, configured to transmit, in response to the request, the random data via the connection to the other electronic device. In an embodiment, wherein the processor may be, when the instructions are executed, configured to receive, from the other electronic device via the connection, the data obtained by encrypting the random data using information on the barcode obtained based on the scan. In an embodiment, wherein the processor may be, when the instructions are executed, configured to authenticate the other electronic device, based on decrypting the data using the information on the barcode.

As described above, according to an embodiment, an electronic device may comprise a camera; at least one communication circuit; a display; a memory configured to store instructions; and a processor operably coupled, directly or indirectly, with the camera, the memory, the at least one communication circuit, and the display. Wherein the processor may be, when the instructions are executed, configured to display a region for displaying a preview image obtained via the camera in a user interface for assisting an initial setup of another electronic device, based at least in part on an advertising signal received from the other electronic device. Wherein the processor may be, when the instructions are executed, configured to request, based on information for a connection with the other electronic device, the connection to the other electronic device, the information included in the advertising signal. Wherein the processor may be, when the instructions are executed, configured to obtain, after the connection with the other electronic device is established, data encrypted based on scanning a barcode displayed in the other electronic device via the region by using the camera. Wherein the processor may be, when the instructions are executed, configured to transmit the data via the connection to the other electronic device to authenticate the electronic device as a device for assisting the initial setup. Wherein the processor may be, when the instructions are executed, configured to transmit at least one signal for assisting the initial setup to the other electronic device, based at least in part on receiving, from the other electronic device via the connection, a signal indicating that the electronic device is authenticated by using the data in the other electronic device.

In an embodiment, wherein the processor may be, when the instructions are executed, further configured to receive, after the signal is received, information on at least one user input for authentication of a user releasing a lock of the electronic device, the information identified in the other electronic device. In an embodiment, wherein the processor may be, when the instructions are executed, further configured to authenticate the user, based on information on the at least one user input and reference data for the authentication, the reference data registered in the electronic device. In an embodiment, wherein the processor may be, when the instructions are executed, further configured to transmit the at least one signal including account information of the user to the other electronic device, based at least in part on authenticating the user.

In an embodiment, wherein the connection may be established via a first communication scheme. In an embodiment, wherein the processor may be, when the instructions are executed, configured to transmit, via the connection to the electronic device, the at least one signal including configuration information for communication through a second communication scheme distinct from the first communication scheme. In an embodiment, wherein the processor may be, when the instructions are executed, configured to establish another connection with the other electronic device, based on a request transmitted through the second communication scheme from the other electronic device based on setting the communication in the other electronic device according to setting of the communication of the electronic device by using the configuration information. In an embodiment, wherein the information on the at least one user input may be received via the other connection from the other electronic device.

In an embodiment, wherein the at least one signal including the configuration information may further include information indicating whether a scheme for the authentication of the user is enabled in the electronic device.

In an embodiment, wherein the processor may be, when the instructions are executed, further configured to transmit, before the at least one signal including the account information is transmitted based at least in part on authenticating the user, the reference data to the other electronic device via the other connection.

In an embodiment, wherein the processor may be, when the instructions are executed, configured to receive a first advertising signal, indicating that the initial setup is initiated, broadcasted from the other electronic device. In an embodiment, wherein the processor may be, when the instructions are executed, configured to display an executable object and information guiding that the electronic device is adjacent to the other electronic device in the user interface, based on the first advertising signal. In an embodiment, wherein the processor may be, when the instructions are executed, configured to display the region for displaying the preview image obtained through the camera enabled in response to a user input on the executable object in the user interface. In an embodiment, wherein the processor may be, when the instructions are executed, configured to broadcast a second advertising signal for indicating that the camera is enabled. In an embodiment, wherein the processor may be, when the instructions are executed, configured to receive a third advertising signal that is the advertising signal including the information based at least in part on a reception of the second advertising signal. In an embodiment, wherein the processor may be, when the instructions are executed, configured to request the connection to the other electronic device, based on the information.

In an embodiment, wherein the processor is, when the instructions are executed, configured to request random data to the other electronic device via the connection, in response to the connection being established. In an embodiment, wherein the processor is, when the instructions are executed, configured to receive the random data from the other electronic device via the connection. In an embodiment, wherein the processor is, when the instructions are executed, configured to obtain the data by encrypting the random data by using information on the barcode obtained via the scanning. In an embodiment, wherein the processor is, when the instructions are executed, configured to transmit the data to the other electronic device.

As described above, according to an embodiment, an electronic device may comprise a speaker; communication circuits including a first communication circuit for a first communication scheme and a second communication circuit for a second communication scheme; a display; a memory configured to store instructions; and a processor operably coupled, directly or indirectly, with the memory, the communication circuits, and the display. Wherein the processor may be, when the instructions are executed, configured to display, before a connection with another electronic device for assisting an initial setup of the electronic device is established according to the first communication scheme, information guiding that the other electronic device is adjacent to the electronic device in a user interface for the initial setup. Wherein the processor may be, when the instructions are executed, configured to authenticate, after the connection is established, the other electronic device, based at least in part on signals outputted via the speaker while the information is displayed. Wherein the processor may be, when the instructions are executed, configured to display, after the other electronic device is authenticated and another connection with the other electronic device is established according the second communication scheme, at least one visual object guiding authentication of a user for releasing a lock state of the other electronic device in the user interface. Wherein the processor may be, when the instructions are executed, configured to receive at least one user input via the at least one visual object. Wherein the processor may be, when the instructions are executed, configured to execute the initial setup based on account information received from the other electronic device on a condition that the user is authenticated in the other electronic device by using information on the least one user input.

In an embodiment, wherein the signals may be used for encrypting data transmitted from the other electronic device for the authentication of the other electronic device, and may include information used for decrypting the data in the electronic device.

In an embodiment, wherein each of the signals may be a signal on inaudible frequency range.

In an embodiment, a throughput of the second communication scheme may be greater than a throughput of the first communication scheme.

In an embodiment, wherein the initial setup may include migrating at least part of a user environment in the other electronic device to the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to"

another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Each embodiment herein may be used in combination with any other embodiment(s) described herein.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   at least one communication circuit;
   a display;
   a memory configured to store instructions; and
   a processor, operably coupled with the memory, the at least one communication circuit, and the display,
   wherein the processor is, when the instructions are executed, configured to:
   display, before a connection with another electronic device for assisting an initial setup of the electronic device is established, a barcode for authenticating the other electronic device in a user interface for the initial setup;
   establish, in response to a request of the connection, the connection, the request transmitted to the electronic device from the other electronic device based on a signal broadcasted from the electronic device;
   receive, via the connection from the other electronic device, data that is encrypted based on scan of the barcode performed through a camera of the other electronic device;
   decrypt the encrypted data by using key information included in the bar code; and
   execute the initial setup based on at least one signal received from the other electronic device after authenticating the other electronic device by using the decrypted data.

2. The electronic device of claim 1, wherein the processor is, when the instructions are executed, configured to:
   display, after authenticating the other electronic device, at least one visual object that guides authentication of a user for releasing a lock state of the other electronic device, in the user interface;
   transmit, to the other electronic device, information on at least one the user input received via the at least one visual object; and
   receive the at least one signal including account information of the user that is transmitted from the other electronic device based at least in part on authenticating the user in the other electronic device by using the information on the at least one user input.

3. The electronic device of claim 2, wherein the connection is established via a first communication scheme,
   wherein the processor is, when the instructions are executed, configured to:
   receive, from the other electronic device via the connection, the at least one signal including configuration information for communication via a second communication scheme distinct from the first communication scheme, before the at least one visual object is displayed, the configuration information stored in the other electronic device;
   set the communication in the electronic device according setting in the other electronic device, based on the configuration information;
   establish another connection with the other electronic device, based on the set communication;
   display the at least one visual object, after the other connection is established; and transmit the information on the at least one user input to the other electronic device via the other connection.

4. The electronic device of claim 3, wherein the at least one signal including the configuration information further includes information indicating whether a scheme for the authentication of the user guided by the at least one visual object is enabled.

5. The electronic device of claim 4, wherein the processor is, when the instructions are executed, further configured to receive reference data for the authentication of the user, before receiving the at least one signal including the account information, the reference data transmitted via the other connection from the other electronic device based on authenticating the user by using the information on the at least one user input in the other electronic device, and
wherein the reference data is data registered for executing the authentication in the other electronic device, and is transmitted from the other electronic device to the electronic device for executing the authentication in the electronic device.

6. The electronic device of claim 1, wherein the processor is, when the instructions are executed, configured to:
broadcast, while the user interface is displayed, a first advertising signal indicating that the initial setup is initiated;
receive a second advertising signal broadcasted from the other electronic device in response to enabling the camera in the other electronic device based at least in part on the first advertising signal; and
display, in response to the second advertising signal, the barcode in the user interface.

7. The electronic device of claim 6, wherein the signal is broadcasted from the electronic device to indicate that the barcode is displayed, and includes information for the connection, and
wherein the processor is, when the instructions are executed, configured to:
broadcast, in response to the display of the barcode, a third advertising signal that is the signal;
receive the request transmitted from the other electronic device based on the information for the connection; and
establish, in response to the request, the connection.

8. The electronic device of claim 1, wherein the processor is, when the instructions are executed, configured to:
receive, in response to the establishment of the connection, a request of random data via the connection from the other electronic device;
transmit, in response to the request, the random data via the connection to the other electronic device;
receive, from the other electronic device via the connection, the data obtained by encrypting the random data using information on the barcode obtained based on the scan; and
authenticate the other electronic device, based on decrypting the data using the information on the barcode.

9. An electronic device comprising:
a camera;
at least one communication circuit;
a display;
a memory configured to store instructions; and
a processor operably coupled with the camera, the memory, the at least one communication circuit, and the display,
wherein the processor is, when the instructions are executed, configured to:
display a region for displaying a preview image obtained via the camera in a user interface for assisting an initial setup of another electronic device, based at least in part on an advertising signal received from the other electronic device;
request, based on information for a connection with the other electronic device, the connection to the other electronic device, the information included in the advertising signal;
obtain, after the connection with the other electronic device is established, data encrypted based on scanning a barcode displayed in the other electronic device via the region by using the camera;
transmit the data via the connection to the other electronic device to authenticate the electronic device as a device for assisting the initial setup; and
transmit at least one signal for assisting the initial setup to the other electronic device, based at least in part on receiving, from the other electronic device via the connection, a signal indicating that the electronic device is authenticated by using the data in the other electronic device.

10. The electronic device of claim 9, wherein the processor is, when the instructions are executed, further configured to:
receive, after the signal is received, information on at least one user input for authentication of a user releasing a lock of the electronic device, the information identified in the other electronic device;
authenticate the user, based on information on the at least one user input and reference data for the authentication, the reference data registered in the electronic device; and
transmit the at least one signal including account information of the user to the other electronic device, based at least in part on authenticating the user.

11. The electronic device of claim 10, wherein the connection is established via a first communication scheme,
wherein the processor is, when the instructions are executed, configured to:
transmit, via the connection to the electronic device, the at least one signal including configuration information for communication through a second communication scheme distinct from the first communication scheme; and
establish another connection with the other electronic device, based on a request transmitted through the second communication scheme from the other electronic device based on setting the communication in the other electronic device according to setting of the communication of the electronic device by using the configuration information, and
wherein the information on the at least one user input is received via the other connection from the other electronic device.

12. The electronic device of claim 11, wherein the at least one signal including the configuration information further includes information indicating whether a scheme for the authentication of the user is enabled in the electronic device.

13. The electronic device of claim 12, wherein the processor is, when the instructions are executed, further configured to transmit, before the at least one signal including the account information is transmitted based at least in part on authenticating the user, the reference data to the other electronic device via the other connection.

14. The electronic device of claim 9, wherein the processor is, when the instructions are executed, configured to:

receive a first advertising signal, indicating that the initial setup is initiated, broadcasted from the other electronic device;

display an executable object and information guiding that the electronic device is adjacent to the other electronic device in the user interface, based on the first advertising signal;

display the region for displaying the preview image obtained through the camera enabled in response to a user input on the executable object in the user interface;

broadcast a second advertising signal for indicating that the camera is enabled;

receive a third advertising signal that is the advertising signal including the information based at least in part on a reception of the second advertising signal; and request the connection to the other electronic device, based on the information.

15. The electronic device of claim 14, wherein the processor is, when the instructions are executed, configured to:

request random data to the other electronic device via the connection, in response to the connection being established;

receive the random data from the other electronic device via the connection;

obtain the data by encrypting the random data by using information on the barcode obtained via the scanning; and transmit the data to the other electronic device.

16. An electronic device comprising:
a speaker;
communication circuits including a first communication circuit for a first communication scheme and a second communication circuit for a second communication scheme;
a display;
a memory configured to store instructions; and
a processor operably coupled with the memory, the communication circuits, and the display, wherein the processor is, when the instructions are executed, configured to:

display, before a connection with another electronic device for assisting an initial setup of the electronic device is established according to the first communication scheme, information guiding that the other electronic device is adjacent to the electronic device in a user interface for the initial setup;

authenticate, after the connection is established, the other electronic device, based at least in part on signals outputted via the speaker while the information is displayed;

display, after the other electronic device is authenticated and another connection with the other electronic device is established according the second communication scheme, at least one visual object guiding authentication of a user for releasing a lock state of the other electronic device in the user interface;

receive at least one user input via the at least one visual object; and execute the initial setup based on account information received from the other electronic device on a condition that the user is authenticated in the other electronic device by using information on the least one user input.

17. The electronic device of claim 16, wherein the signals are used for encrypting data transmitted from the other electronic device for the authentication of the other electronic device, and include information used for decrypting the data in the electronic device.

18. The electronic device of claim 16, wherein each of the signals is a signal on inaudible frequency range.

19. The electronic device of claim 16, wherein a throughput of the second communication scheme is greater than a throughput of the first communication scheme.

20. The electronic device of claim 16, wherein the initial setup includes migrating at least part of a user environment in the other electronic device to the electronic device.

* * * * *